(12) United States Patent
Mohanty et al.

(10) Patent No.: US 7,752,562 B2
(45) Date of Patent: Jul. 6, 2010

(54) DETECTION OF PROCEDURAL DEFICIENCY ACROSS MULTIPLE BUSINESS APPLICATIONS

(75) Inventors: Bhanu Mohanty, Santa Clara, CA (US); Kamlesh Deshmukh, Fremont, CA (US); Srirama Ruthala, Fremont, CA (US)

(73) Assignee: SAP AG, Walldorf (DE)

( * ) Notice: Subject to any disclaimer, the term of this patent is extended or adjusted under 35 U.S.C. 154(b) by 326 days.

(21) Appl. No.: 11/639,985

(22) Filed: Dec. 15, 2006

(65) Prior Publication Data

US 2008/0147610 A1 Jun. 19, 2008

(51) Int. Cl.
G06F 13/00 (2006.01)
G06F 15/00 (2006.01)

(52) U.S. Cl. ...................................... 715/765; 715/763
(58) Field of Classification Search ......... 715/763–765, 715/739, 810, 740–744, 851–853
See application file for complete search history.

(56) References Cited

U.S. PATENT DOCUMENTS

2004/0102940 A1* 5/2004 Lendermann et al. .......... 703/6
2008/0082375 A1* 4/2008 Kennis et al. .................. 705/7

* cited by examiner

*Primary Examiner*—Cao (Kevin) Nguyen
(74) *Attorney, Agent, or Firm*—Schwegman, Lundberg & Woessner, P.A.

(57) ABSTRACT

A method includes retrieving a plurality of data extractors to extract data across a plurality of business applications. The plurality data extractors are executed to generate a plurality of individual results sets. The plurality of individual results sets are combined into a combined result set. A rule is applied to the combined result set to detect a procedural deficiency across the plurality of business application.

27 Claims, 13 Drawing Sheets

DETECTION OF PROCEDURAL DEFICIENCY ACROSS MULTIPLE BUSINESS APPLICATIONS

FIELD

This application relates to a method and system to perform computer based business application functions.

BACKGROUND

Enterprise resource planning (ERP) systems are management information systems that integrate, automate, track, and regulate many business practices of a company. ERP systems can address many facets of a company's operation, such as accounting, sales, invoicing, manufacturing, logistics, distribution, inventory management, production, shipping, quality control, information technology, and human resources management. ERP systems can include computer security to protect against outside crime such as industrial espionage, and to protect against inside crime such as embezzlement. ERP systems can be set up to detect, prevent, and report a variety of different occurrences of fraud, error, or abuse. ERP systems can be oriented to the company's interactions with customers ("front end" activities), quality control and other internal workings of the company ("back end" activities), interactions with suppliers and transportation providers ("supply chain"), or other aspects of business.

It is becoming increasingly beneficial for companies to supplement ERP systems with compliance control applications in view of recent laws such as "The Sarbanes-Oxley Act of 2002" (Pub. L. No. 107-204, 116 Stat. 745, Jul. 30, 2002), also known as "Sarbanes-Oxley" or the "Public Company Accounting Reform and Investor Protection Act of 2002" or "SOX." Sarbanes-Oxley seeks to protect investors by improving the accuracy and reliability of corporate disclosures. The act covers issues such as establishing a public company accounting oversight board, auditor independence, corporate responsibility, and enhanced financial disclosure.

Among other things, Sarbanes-Okley requires CEOs and CFOs to certify financial reports. Moreover, Sarbanes-Oxley mandates a set of internal procedures designed to ensure accurate financial disclosure.

Although modern ERP systems help companies become better organized and some even address the challenges of regulatory requirements such as Sarbanes-Oxley, operating, administering, or modifying an ERP system can be exceedingly complex. Indeed, because of their wide scope of application within a company, ERP software systems rely on some of the largest bodies of software ever written.

BRIEF DESCRIPTION OF DRAWINGS

Some embodiments are illustrated by way of example and not limitation in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

ERP monitoring solutions often assess risk "after-the-fact" through the use of detection solutions that operate on downloaded data. For a large enterprise, downloading can take hours. By the time the download and analysis are complete, new users, new role assignments, and new transactions have already altered the system. Any corrective work may fail to eliminate the conflict, since it would be executed on an already-changed system. And, whether the corrective work succeeded would not be known until another download and analysis can be completed. There is significant potential for cascading negative effects.

Moreover, since constant downloading depletes information technology (IT) and system resources, few advocates of after-the-fact monitoring execute a controls analysis more frequently than daily or weekly. Depending on the frequency of downloading and analysis, violations could persist for a considerable length of time before being discovered. By the time risk is assessed in this manner, the damage might already be done. In this respect, some conventional solutions expend considerable computing resources to assess risk, yet still are not fast enough.

ERP products are also supplied by a variety of vendors. Some examples include SAP R13 (or mySAP ERP) from SAP, PeopleSoft (or Oracle Financials) of Oracle Corporation, BPCS from SSA Global Technologies, Enterprise Business System from Made2Manage Systems, NetERP from NetSuite Inc., Microsoft Dynamics from Microsoft Business Division, Ramco e.Applications from Ramco Systems, SYSPRO ERP software from SYSPRO, and more. In some or all cases, these products are not compatible with each other. Still, a single company could conceivably use ERP products of different vendors concurrently.

This, however, would expose the company to inter-application risks, namely, risks that occur across the different ERP systems. None of the individual ERP systems is capable of detecting these inter-application risks.

Even though companies may utilize an ERP system to monitor and enforce their business process controls on an ongoing basis, there is no assurance that such ERP application is properly configured to effectively and reliably guard against fraud and errors as well as to minimize inefficiencies. Due to the complexity of ERP systems, there are cases where there are still deficiencies in the system of risk controls, and these may be not easily uncovered. Breakdown in these controls can prove extremely costly through higher rates of fraud, significantly higher auditing costs, increased possibility of financial restatements, and diminished investor confidence.

Figure 1:
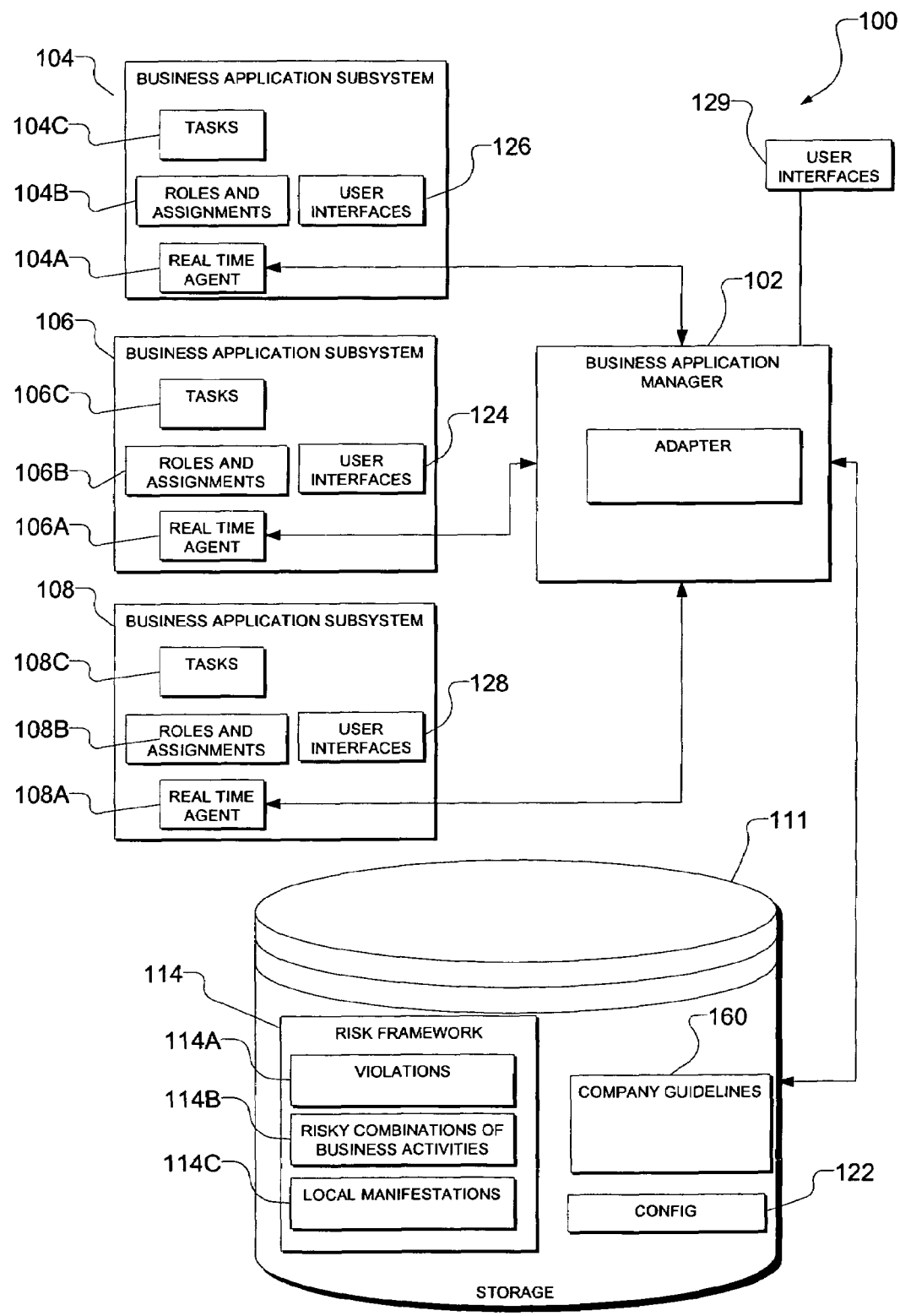
FIG. 1 is a diagrammatic representation of a data-processing system, according to example embodiment

One aspect of the present disclosure concerns a business application system, which may be embodied by various hardware/software components and interconnections, with one example being described by the system 100 of FIG. 1. There are various data processing components of FIG. 1, such as the business application manager 102, local business application subsystems 104-106, real-time agents 104a-106a, and the like. These components may be implemented by one or more hardware devices, software devices, a portion of one or more hardware or software devices, or a combination of the foregoing. The makeup of these subcomponents is described in greater detail below, with reference to FIGS. 3-5.

The components of the system 100 are operated on behalf of a client such as a company, partnership, joint venture, corporate subdivision, government unit, family, non-profit, individual, trust, or other organization or entity. In other words, data managed by the business application subsystems 104-106 relates to the business or other concerns of the client. The client may operate the system 100 itself, or another entity may operate the system 100 on the client's behalf.

The system 100 carries out various business activities under direction of its users, received via user interfaces such as 124-128 and 129. Another function of the system 100 is to guide, regulate, and control user activity to avoid violating various company guidelines 160. The guidelines 160 may be embodied by one or more sets of company policies, government regulations, penal law, accounting rules, good business practices, conditions imposed (for example by a charter, articles of incorporation, grant money, requirements of non-profit status, etc.), a combination of some or all of the foregoing, or any other desired guidelines regulating activity of the entity on whose behalf the business activities of the system 100 are being conducted. Although "company" is used throughout this description, this is given in the context of a typical implementation, and should not be understood to limit the guidelines to the context of a corporation or other particular organization. These teachings are similarly applicable to any conceivable entity, certain examples of this having been given above.

For ease of explanation, guidelines 160 are illustrated as part of the system 100. In this respect, the guidelines 160 may be stored or referenced by the system 100, and more particularly, contained in the storage 111. Nevertheless, the guidelines 160 need not constitute part of the system 100 at all, in which case they are shown and discussed for ease of description and understanding.

The system 100 includes a shared business application manager 102 coupled to various local business application systems 104, 106, 108. The manager 102 is a central module programmed to perform operations including analyzing and detecting risks occurring within individual business application subsystems, as well as across multiple business application subsystems.

In a specific example, the manager 102 is implemented by a software module written in Java. Advantageously, even where the local subsystems 104-108 are incompatible with each other, the manager 102 can be used to monitor the incompatible business application systems for compliance with company guidelines. As described in greater detail below, the manager 102 may collect data from the real-time agents 104a-108a in order to perform various high level tasks such as risk detection, simulation, mitigation, remediation, reporting, etc.

In the illustrated example, the business application subsystems 104-108 embody different business application products. The example embodiment contemplates a situation where these business application subsystems are not compatible with each other. The business application subsystems 104-108 provide software that serves an exclusive mechanism to perform various predefined tasks on request of networked users; each subsystem also defines which of the users is permitted to perform tasks of that subsystem. As an example, OBBA subsystems may perform functions such as ERP, web server based logistics, legacy applications, physical provisioning, compliance with regulatory or other governmental regulations, or other computer based business applications.

Some examples of ERP subsystems include SAP R/3 from SAP, PeopleSoft from Oracle Corporation, Oracle Financials from Oracle Corporation, BPCS from SSA Global Technologies, Enterprise Business System from Made2Manage Systems, NetERP from NetSuite Inc., Microsoft Dynamics from Microsoft Business Division, Ramco e.Applications from Ramco Systems, SYSPRO ERP software from SYSPRO, etc. Some examples of legacy applications include file directories, mainframe computers, file servers, and other data repositories.

Coupling of the business application manager 102 to the subsystems 104-108 occurs via respective real-time agents 104a-108a. Each real-time agent 104a-108a is a program module embedded into the software of its respective local business application host 104-108. In one example, "embedded" real-time agents mean that the real-time agents are integrated into the same software, firmware, logic circuitry, hardware, or other processing features of the host 104-108.

In the case of a business application subsystem that uses an SAP software package, for example, an embedded real-time agent may be written in the proprietary SAP native language such as Advanced Business Application Programming (ABAP). Further, functions of a real-time agent in an SAP subsystem may be directly connected to SAP transactions such as SuO1, SU1O, profile generator (PFCG), user authorization transactions, and the like. The structure and operation of the real-time agents are discussed in greater detail below.

The subsystems 104-108 are coupled to respective user interfaces 124-128. The user interfaces 124-128 comprise any device or tool for users to enter input into the local units, and receive output therefrom. The manager 102 is also coupled to one or more user interfaces such as 129. Exemplary user interfaces may employ some or all of the following: a mouse, keyboard, video display, touch screen, or any other device, tool, or software module to perform the functions required by this disclosure.

Each of the business application subsystems 104-108 includes a statement of local business tasks (104c-108c). The tasks are stated in a language, syntax, or other format proprietary to the host business application subsystems 104-106. The tasks 104c-108c serve to carry out business activities of the business application subsystems 104-106. In the case of a business application subsystem that is implemented by an ERP system, some examples of the business activities carried out by the tasks 104c-108c include creating an invoice, paying an invoice, creating an invoice, updating vendor information. In most cases, these business activities are related to the automation of business processes from beginning to end. Some examples include procurement to payment, orders to cash, production processing and human resource benefit payment and processing. In the case of a business application subsystem implemented by a legacy file server, the business activities concern fife operations such as reading data, deleting data, writing data, and other disk or storage management operations.

Each business application subsystem 104-108 also includes a statement of roles and assignments, such as 104b-106b. Broadly, the roles and assignments specify which people can perform which of the tasks 104c-108c. A role may be a collection of tasks that a person or job title is permitted to perform. There may also be composite roles, which are groups of single roles. Thus, the roles outline different collections of tasks in the respective subsystem 104-108, and the assignments indicate which people are assigned to which roles. The assignments may connect people to roles directly, or they may connect job titles to roles and, independent of that, connect people to job titles. Accordingly, one function of the roles/assignments 104b-108b is to indicate the necessary permission that a requesting user must have in order for the corresponding business application subsystem to perform the requested task 104c-108c.

In the case of an ERP implementation of a subsystem 104-108, roles and assignments 104b-108c may (for example) prescribe that a given person can perform create invoices. In the case of a legacy implementation of a subsystem 104-108, roles and assignments may (for example) prescribe peoples' IT access rights to system resources, as with a data repository shared by network users.

The manager 102 includes or has access to digital data storage 111, such as one or more servers, hard drives, personal computers, mainframe computers, optical disks, or any other digital data storage devices appropriate to suit the needs of this disclosure. The storage includes subcomponents 114, 122 in this example. These subcomponents may be implemented by the same or different physical devices, logical devices, storage sectors or other regions, register, pages, linked list, relational databases, or other storage unit without limitation. Operation and use of the subcomponents of the storage 111 are described in greater detail below. The following is a brief description.

A configuration record 122 maintains various default settings, user-selectable options, and the like, used to set or change the functionality of the business application manager 102. In other words, the configuration record 122 provides a record of various options as to how the business application manager 102 operates. The configuration record 122 may include some settings set by (1) request of local users of business application subsystems 104-108, (2) a system level user (e.g., via user interface 129), (3) default, (4) a combination of these, (5) another mechanism. The configuration record 122 may therefore provides a record of default and/or optioned settings for virtually any aspect of the operation of the business application manager 102 as such operation is described throughout the present disclosure.

Broadly, the risk framework 114 defines activities and conditions that, if one or more business application subsystems 104-108 are configured to permit these, a door will have been opened for someone to commit a violation of company guidelines 160.

One component of the framework 114 is a violations module 114a that outlines violations of the applicable company guidelines (described above) that are capable of being perpetrated using the system 100. Relatedly, the violations module 114b outlines combinations of business activities that, if entrusted to a single person, would give that person the potential to perpetrate one of the violations 114a.

In one example, the definition of combinations of business activities containing the potential to cause violations 114a employs includes segregation of duties as a primary internal control intended to prevent, or decrease the risk of errors or irregularities. This may be achieved by assuring that no single individual has control over all phases of a business transaction. In one example, there are four general categories of duties: authorization, custody, record keeping, and reconciliation. In an ideal system, different employees perform each of these four major functions. In other words, no employee has control of two or more of these responsibilities. The more negotiable the asset, the greater the need for proper segregation of duties, especially when dealing with cash, negotiable checks, and inventories.

There are business areas where segregation of duties may be desirable. Cash handling is an example, because cash is a highly liquid asset. This means it is easy to take money and spend it without leaving a trail of where it went.

Any department that accepts funds, has access to accounting records, or has control over any type of asset may be concerned with segregation of duties. Some examples of incompatible duties include:

authorizing a transaction, receiving and maintaining custody of the asset that resulted form the transaction.

receiving checks (payment on account) and approving write-offs.

depositing cash and reconciling bank statements.

approving time cards and having custody of pay checks.

For each risky combination 114b of generic business activities, the risk framework 114 sets forth local manifestations of that risk that are managed by a local manifestations module 114c. Particularly, for a given combination of risky business activities 114b, the local manifestations module 114c identifies all the different business application subsystem specific tasks 104c-108c that could be used to carry out these combinations. In this regard, the local manifestations module 114c may identify subsystem tasks 104c-108c by particular codes, entries, configurations, combinations, or other details compatible with the local business application language of that subsystem. The local manifestations may include different subparts (not separately shown) individually applicable to the different subsystems 104-108. For example, one subpart may contain local manifestations particular to an SAP system, another subpart containing local manifestations particular to an Oracle system, etc.

In one example, the risk framework 114 may be implemented entirely by the local manifestations 114c, omitting the violations 114a and combinations 114b. In this case, the modules 114a-114b are shown in the storage 111 merely for purposes of illustration and explanation of the concepts behind the risk framework 114.

In the example where one of the subsystems 104-108 is implemented by an SAP ERP system, the local manifestations of the module 114c may be implemented using the substantial library of segregation of duties rules from the Compliance Calibrator version 5.0 software of SAP AG.

Figure 2:
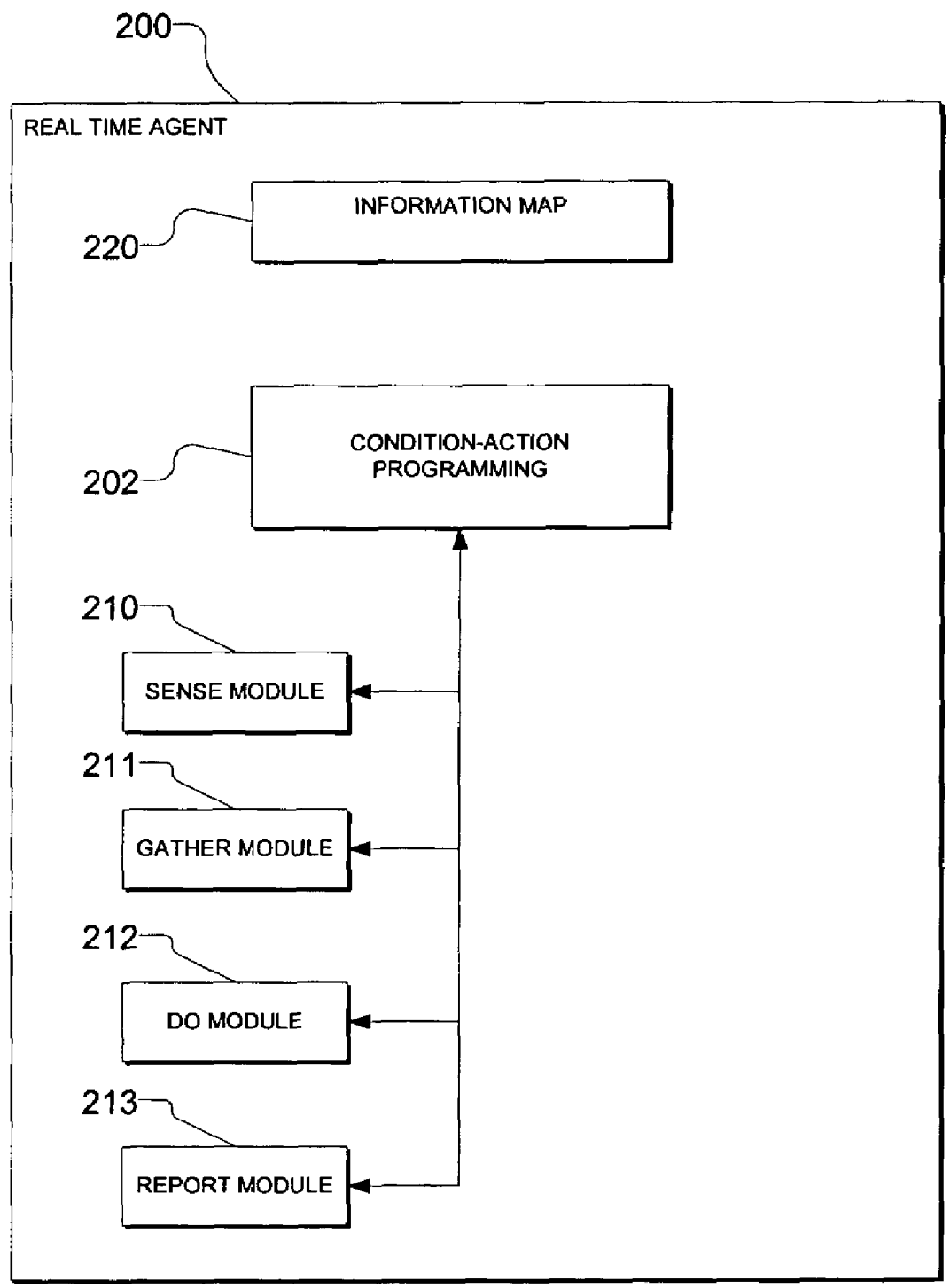
FIG. 2 is a diagrammatic representation of an architecture of a real-time agent, according to an example embodiment.

Besides the overall business application architecture of FIG. 1, a different aspect of the present disclosure concerns the makeup of the individual real-time agents 104a-108a. Each real-time agent may be embodied by various hardware/software components and interconnections, with one example being described by the real-time agent 200 of FIG. 2. In the present example, each real-time agent 200 comprises a software module embedded into a respective host" business application subsystem 104-106.

The example real-time agent 200 includes condition-action programming 202, various other modules 210-213, and an information map 220. As described in greater detail below, the programming 202 conducts business application subsystem level functions, in cooperation with the business application manager 102, in order to help the manager 102 identify, prevent, and report the potential for violating guidelines 160 in and across the business application subsystems 104-108. For ease of description, the real-time agent 200 is described in the context of the subsystem 104 as host.

The programming 202 together with the modules 210-213 provide a set of operating instructions for the real-time agent 200. Broadly, the programming 202 identifies conditions, and in response, activates one or more of the modules 210-213. The operation of the real-time agent 200 and its subcomponents are described in greater detail below.

An information map 220 is accessible by the sense, gather, do, and report modules 210-213. The map 220 lists the location of various client data, configuration settings, and other information stored in the host business application subsystem.

Data may be listed by physical or logical address, device, pointer, sector, or other useful identifier. In the example 104, the map 220 indicates the location of the roles 104b, tasks 104c, configuration data of the subsystem 104, and other client information, metadata, and configuration settings.

Having described the structural features of the present disclosure, the operational aspect of the disclosure will now be described. The operations of any method, process, or algorithm described in connection with the embodiments disclosed herein may be embodied directly in hardware, in a software module executed by hardware, or in a combination of the two.

Each of the business application subsystems 104-108 conducts various computer based business application operations, depending upon the particular software package of the subsystem and the client subject matter that is being managed. As to the software package, this may involve well known tasks of products such as SAP R13 (or mySAP) from SAP, PeopleSoft or Oracle Financials from Oracle Corporation, BPCS from SSA Global Technologies, Enterprise Business System from Made2Manage Systems, NetERP from NetSuite Inc., Microsoft Dynamics from Microsoft Business Division, Ramco e.Applications from Ramco Systems, SYSPRO ERP software from SYSPRO, legacy software, or another product. As to the client subject matter, this may comprise an accounting system, accounts payable, inventory system, governmental bidding or contract compliance, regulatory compliance, human resources, quality control, or any other subject matter.

In a specific example, the business application subsystems 104-108 permit users to conduct various tasks 104c-108c, such as creating invoices, paying invoices, creating accounting reports, etc. However, the subsystems 104-108 limit the conditions under which the tasks 104c-108c are performed according to the roles and assignments 104b-108b. Thus, if a user of the subsystem 104 requests to perform one or more of the tasks 104c and the subsystem 104 determines that is outside the user's role 104b, the subsystem 104 prevents, terminates, or reports the performance of this task.

Figure 3:
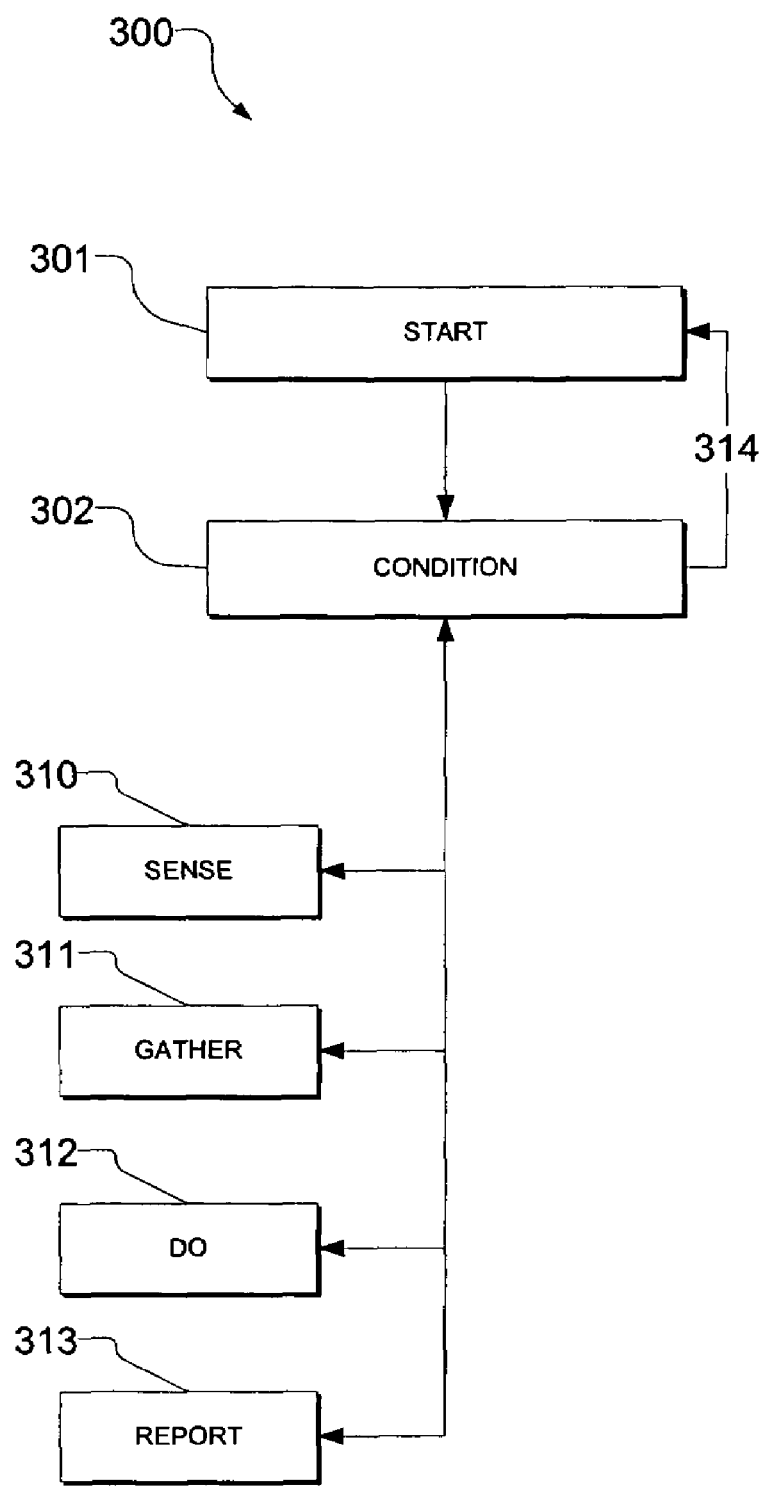
FIG. 3 shows a sequence for operating a real-time agent, according to an example embodiment.

FIG. 3 shows a sequence 300 for operating an individual one of the real-time agents 104a-108a, according to one example. Although the sequence 300 may be implemented in a broader context, for ease of explanation the following description is made in the specific environment of FIGS. 1-2. Specifically, the sequence 300 is described in context of the real-time agent 104a.

In operation 301, the real-time agent 104a begins operation. Operation 301 may occur, for example, when the host business application subsystem 104 is installed, manufactured, configured, initially booted, rebooted, etc. As a different example, the real-time agent may begin operations separately from the host business application subsystem.

In operation 302, the condition-action programming 202 determines whether any of various predetermined conditions exist. Broadly, the conditions include status of the host business application subsystem or events occurring within it as previously determined by the sense or gather modules 210/211, communications received from the business application manager 102, status of execution of the modules 210-213, etc. The following describes some examples of conditions:

A condition that the real-time agent 104a has sensed (310) receipt of an instruction from the business application manager 102.

A condition that one or more of the tasks 310-313 (described below) has completed.

A condition that one or more of the tasks 310-313 has completed with a certain result. For example, a sense task 310 finding that a user has submitted a request to change a role of 104b.

A condition indicating that the real-time agent 104a has sensed (310) the existence of certain data, operational configuration, or other state or context of the subsystem 104 or any of its subcomponents.

Other conditions pertaining to the subsystem 104 and/or its communications with users or the business application manager 102.

To avoid missing the occurrence of any conditions, the check for conditions (operation 302) is conducted repeatedly, as shown by 314. Operation 302 may be performed periodically, on a non-periodic schedule, responsive to a timer or clock, responsive to a frequently occurring event, or other trigger.

When the condition-action programming 202 finds occurrence of a predefined condition in operation 302, the programming 202 invokes one or more of the operations 310-313 according to predetermined logic of the programming 202. The tasks 310-313 are performed by respective modules 210-213, and operate according to the functionality of the modules 210-213 described above.

In operation 310, the sense module 210 passively observes messages, signals, events, and other occurrences in the host subsystem 104. For example, the module 210 senses when a user requests to change a role or assignment 104b. As another example, the module 210 may sense existence of sensitive configuration parameters, such as a "sense duplicate invoices" option being turned off for a certain vendor. The module 210 may also sense critical data values, such as when a recurring entry exceeds a given threshold. As another example, the module 210 may sense when commands are received from the business application manager 102.

To perform operation 310 with sufficient frequency, the relevant condition (302) may be arrival of a recurring alarm, schedule, etc. Depending upon the condition-action programming 202, different results of operation 310 create may create different conditions, which (when operation 302 is performed again) trigger the performance of other tasks 310-313. For instance, operation 310 may sense a user request to create a role, which constitutes a condition (302) resulting in reporting (313) of this situation to the business application manager 102.

In operation 311 responsive to the appropriate condition (302), the gather module 211 actively obtains information about activity in the host business application subsystem.

For example, the gather module 211 may retrieve information from the host subsystem 104's roles and assignments (104b), tasks 104c, other data the subsystem 104, default or user configuration of the subsystem 104, etc. As further examples of the operations 311 of gather module 211, these may seek to collect information supporting any of the controls described above. In performing task 311, the gather module 211 makes use of the map 220. For instance, in response to a general request for information (operation 302), the module 211 in operation 311 may consult the map 220 to identify specific storage locations in the host business application subsystem 104 where such data is located.

With operation 311, some examples of a preceding condition (302) include a direct command from the business application manager 102, or the completion of any of the tasks 310-313, a particular result of the tasks 311-313, etc. Depending upon the condition-action programming 202, different results of operation 311 create may create different conditions, which when operation 302 is performed again, trigger the performance of other tasks 311-313. For instance, the completion of task 311 may trigger (operation 302) reporting 313 of the results to the business application manager 102, or performance of a follow up action (312).

In operation 312, the do module 212 performs affirmative acts of the real-time agent 200. As one example, the do module 212 may prevent a change in roles and assignments (104b), prevent assignment of a role to a user, etc. As another example, the do module 212 may create a "case", assign a case number, fill-out the case with various information obtained from the sense and gather module 210, 211. In the case of operation 312, the condition (302) may specify that the do module 212 operate responsive to a request, trigger, or other act initiated by the business application manager 102, or responsive to the completion or result of another of the tasks 310-313.

In operation 313, the report module 213 prescribes operations of sending messages, files, data compilations, alerts, or other reports to the business application manager 102. Operation 313 is performed in response to conditions (302) such as command from the business application manager 102, or responsive to completion or result of a previous one of tasks 310-313.

With the modules 210-213 at its disposal, the programming 202 may orchestrate complicated operations by combining the tasks 310-313 in various combinations with various conditions (302) precedent. Some examples include composite operations such as sense and do, sense and report, gather and do and report, etc. For instance, responsive to the sense module 210 detecting (310) that a user has requested a role change, the programming 202 may direct module 211 to gather (311) information about the user, and then direct module 213 send (313) a report of the collected information to the business application manager 102.

Figure 4:
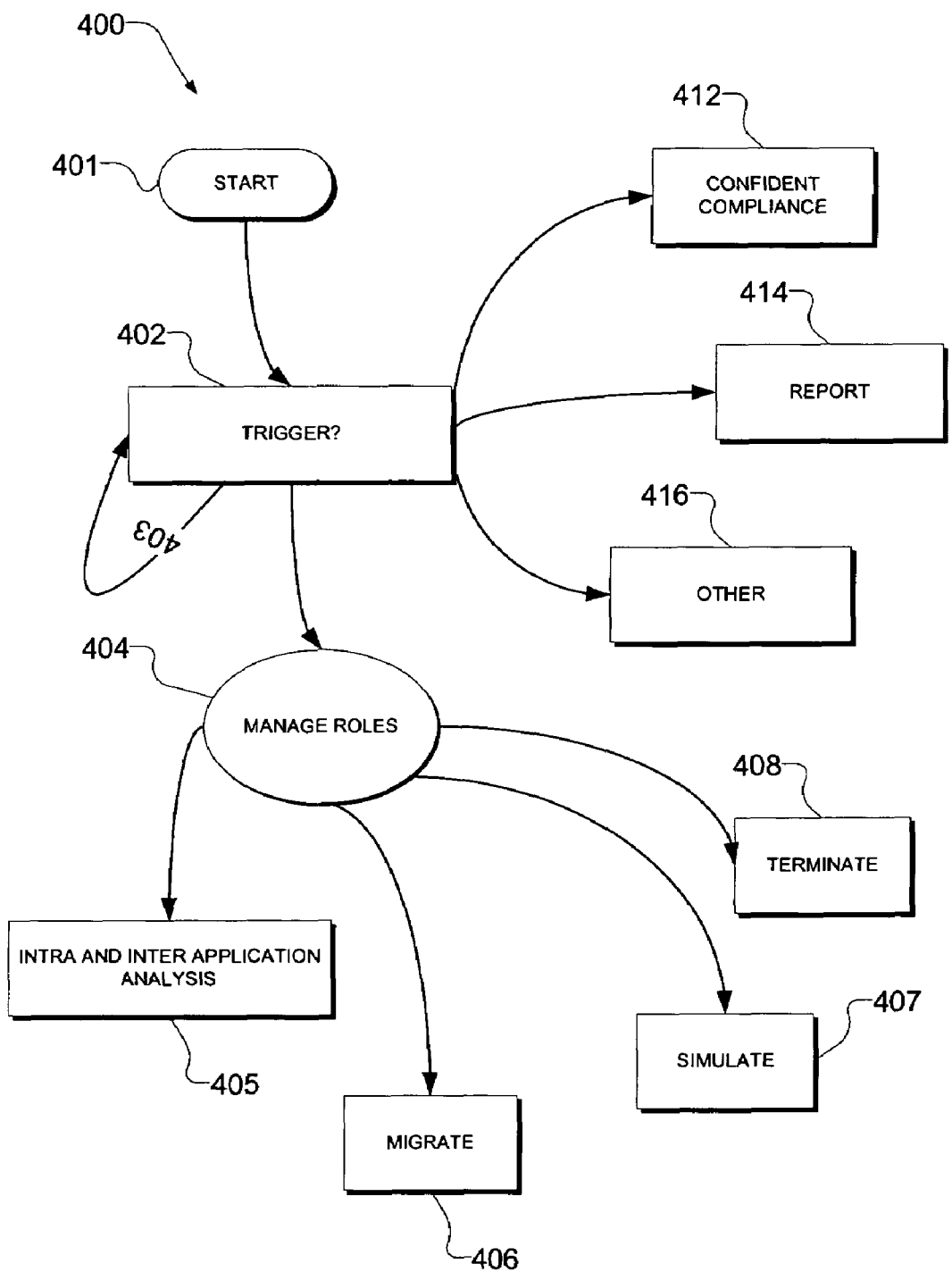
FIG. 4 shows a sequence for performing various system functions including operations occurring across several incompatible business application subsystems, according to an example embodiment.

FIG. 4 shows a sequence 400 for performing various system functions including operations occurring across several incompatible business application subsystems, according to one example of the method aspect of this disclosure. Although the sequence 400 may be implemented in a broader context, for ease of explanation the following description is made in the specific environment of FIGS. 1-2. More particularly, the sequence 400 is described in reference to the business application manager 102.

Broadly, in operation 401 the business application manager 102 begins managing the system 100. Operation 401 may commence upon installation of the business application manager 102, configuration, reconfiguration, boot up, addition of another real-time agent, upgrade of a system component such as the manager 102, etc. After the business application manager 102 starts (401), the manager 102 asks (402) whether one of various triggers has occurred. Each trigger 402 is one of various predefined tasks, events, conditions, or other occurrences. Some examples of triggers include arrival of a given message from one of the real-time agents 104a-108a, arrival of a predetermined time, expiration of a counter, detection of a condition of the potential for a violation of guidelines 160 occurring on the business application subsystems, etc. Instances of different triggers are described in greater detail below.

Occurrence of a trigger (402) leads the business application manager 102 to perform one of the tasks 404, 412, 414, 416. In any case, the check for a trigger (402) is performed on a repeating basis (403) to avoid missing any new triggers that occur, regardless of whether one of the processes 404, 412, 414, 416 is already underway due to a previous trigger.

In operation 404, the business application manager 104 assists business application subsystem users in creating, modifying, redefining and modifying roles 104b-108b. The trigger 402 for the operation 404 occurs when a local real-time agent sends a report (operation 313, FIG. 3) to the business application manager 102 that a user has requested to add a new role or modify an existing role. In this disclosure, such a request is referred to as a "role change" request. Responsive to detecting the role change request (402), in operation 404 the business application manager 102 receives, analyzes, and processes the user's role change request.

In one example, operation 404 may employ the ROLE EXPERT version 4.0 software product of SAP AG. During operation 404, the business application manager 102 employs the applicable real-time agent to provide a substantially real-time interface to the user and host business application subsystem. Some example operations of the role management task (404) include the following:

showing multiple roles and their common relationship to a job or position, regardless of subsystem boundaries.
defining and maintaining role definitions.
defining and maintaining tasks.
comparing roles and role definitions.
displaying user information.
reviewing objects assigned to a role.
defining a composite role.

In addition to these, operation 404 may facilitate a number of reports and utilities, with the following serving as some examples:

generating role reports.
checking TCodes in menu and authorizations.
comparing users' roles.
listing roles assigned to a user.
listing roles and transactions.
checking role status.
creating or modifying derived roles.

counting authorizations for roles or users.
analyzing owners, roles, and users.
identifying transactions executed by users or roles.

Optionally, role management 404 may be applied with various enhanced functions related to role creation. When roles are created they may be created to cover generic positions or activities related to jobs. Many people in the organization may be able to complete the same activities but are limited to only those activities associated with one entity or location. This means that the capabilities remain the same but the location or entity may vary. So an Accounts Payable Clerk may exist in hundreds of company plants, in which case, the only variation of the role is what plant. Once the alternative values for the plant are specified, the real-time agent generates all the variations by inserting the organizational limitations into the roles. Thousands of roles can also be maintained by using the real-time agent to find all roles with common elements that need to be changed. For example reorganizations or mergers may cause certain role contents to vary. The real-time agent will display the roles affected and allow the user to change all roles with unique values as opposed to using the conventional one by one method provided by the native system tools.

In addition to the foregoing functions, operation 404 may facilitate various risk reports, which employ the risk analysis of operation 405, as discussed below. Risk reports, requested by users of the subsystems 104-106, may include reports presenting risks or conflicts, the occurrence of critical transactions by user or role or profile or HR object, etc.

The process 400 includes a number of peripheral tasks related to operation 404. Namely, once the business application manager 102 has embarked on the role management process 404, the business application manager 102 offers other related processes to the user. In addition to directing the user toward the tasks 405-408, task 404 may coordinate use of the different tasks 405-408 to implement an intelligent and systematic approach to performing various user operations. For example, after a requested role change request is found to violate the risk framework 114 (as learned in task 405, described below), task 404 may permit an approver to de-select roles one-by-one and then to simulate (task 404, described below) the effects of that modified profile. This allows the approver to check whether the proposed role(s) continue to pose segregation of duties violations, and at what point they stop. In this way, the approver can also isolate which specific role or combination of roles is the cause of the segregation of duties violations. In another example, operation 404 ensures that sensitive access is not introduced without management acknowledging its presence, and ensures that sensitive access is approved before roles are made available for use. In another example, the operation 404 may provide an emergency "fire fighter" function to track activities of personnel when utilizing sensitive roles.

Optionally, the operation 404 may also include a computer-assisted remediation function, whereby the business application manager 102 assists a business application subsystem user (such as a role approver) in treating risks found in the analysis of operation 405. In remediation, the business application manager 102 coordinates options such as removing a requested or proposed role addition or change that caused a risk violation found in operation 405, or commencing mitigation 406, etc. After completing the selected one of these options, the resulting role change more closely satisfies the guidelines 160.

Furthermore, remediation may include timely reporting and documentation of the actions taken to investigate the risk, and also provide evidence that management is actively managing risk and/or complying with regulations. In the case of process controls, the reporting of risky conditions may be based on a transaction exceeding a "tolerance" level in the rule. An example is payment terms are usually thirty days, however, on one transaction they are changed to sixty. Notification to a responsible person will allow them to evaluate the circumstances associated with the exception and either change it back or document the circumstances and justification for the variance. This is prevalent for special one-time transactions that are created outside the normal course of business that need to be reviewed to make sure financial reporting restrictions or regulations are not violated. Some detailed examples of the task 405-408 are described as follows.

Running Risk Analysis: In operation 405, the business application manager 102 analyzes each requested role change (from 404) to determine whether it would violate the risk framework 114. For example, in the case of the business application subsystem 104, the business application manager 102 analyzes role change requests to determine whether the proposed role change, if implemented in 104b, would violate the risk framework 114. For ease of discussion, role "changes" are understood to include role modifications as well as role additions.

Operation 405 may be performed upon request of a user or approver, or automatically whenever a user submits a role change request to a subsystem. In operation 405, the business application manager 102 invokes the appropriate real-time agent to gather from the subsystem 104 (and report back) all related information concerning the role change request, including content of the request, information about the subject role, etc. The required information may be prescribed, for example, by the risk framework 114. With this information, the manager 102 then compares the gathered information to the local manifestations (module 114c) to see if there is a match. If the gathered information matches the local manifestation 114c appropriate to the relevant host subsystem 104-108, the role change as proposed contains the potential to violate the company guidelines 160.

Advantageously, due to the business application manager 102's position to centrally supervise role management across all subsystems 104-108, the manager 102 can also conduct cross-application analysis to detect risk (e.g., the potential for violations of the guidelines 160) occurring across multiple business application subsystems, even though no risk may be present within one business application subsystem or another. In this respect, operation 405 considers a given role change request by directing the real-time agents 104a-108a to collect all related information from the respective subsystems 104-108, bundling this data and analyzing the bundled data as a whole against the body of local manifestations 114c.

Thus, the business application manager 102 can detect issues across the subsystems 104-108. In one example, the business application manager 102 goes to each subsystem and looks for a "user id" in that system, and it detects then gathers technical information for comparison to the risky combinations in the rules framework. When there are matches, the source data gathered is able to track which ones belong to which systems. For example, if a user can update a vendor in one subsystem and make a payment in another subsystem, the application manager 102 will discover both and then report from which role in which system the match was found.

In this manner, then, the business application manager 102 can detect any of the risks (114a) occurring across multiple business application subsystems. As a further advantage, information required to conduct the analysis of operation 405 is obtained substantially in real-time using the real-time agents 104a-108a, rather than having to wait for time consuming downloads of information from business application subsystems 104-108.

Figure 5:
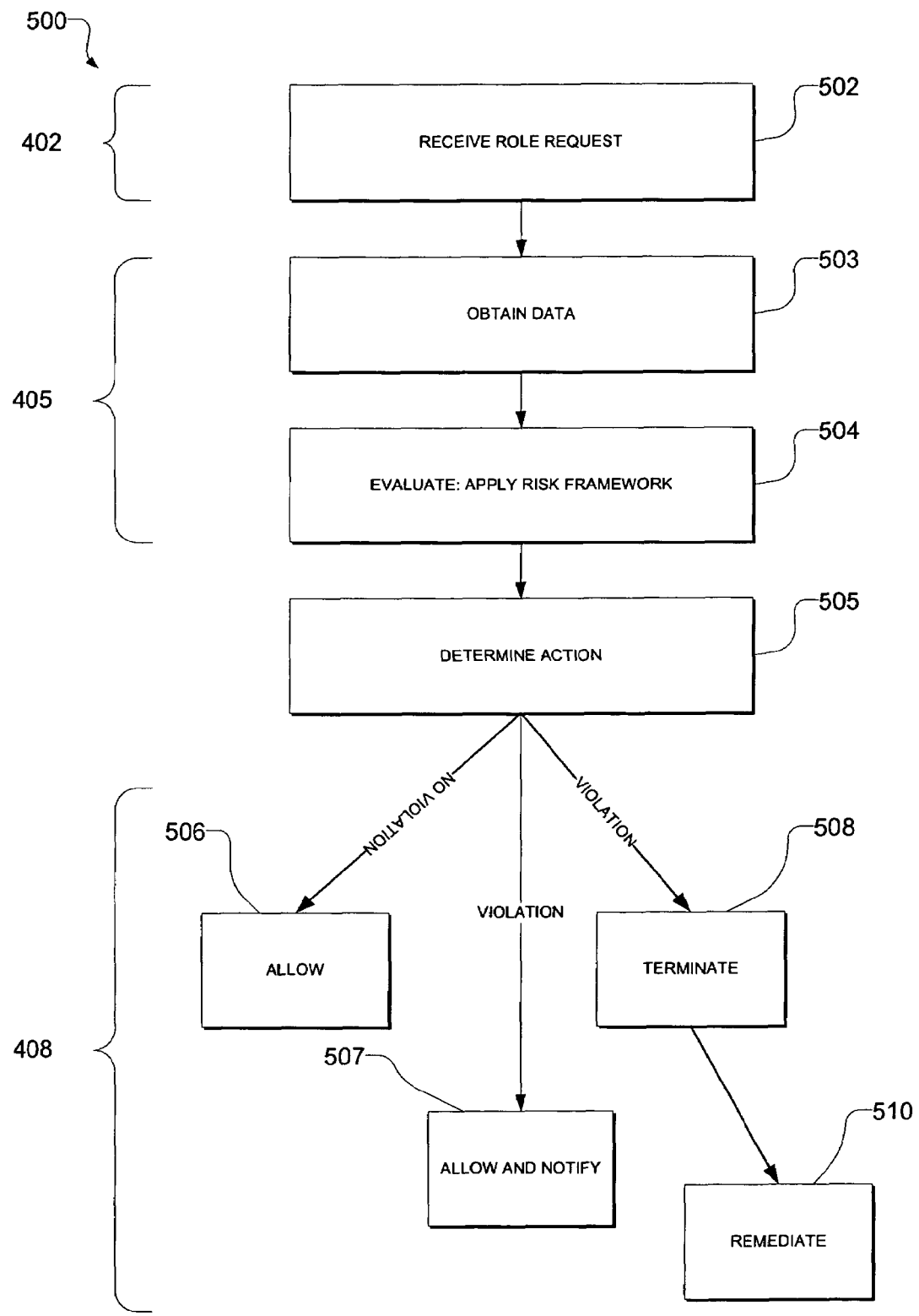
FIG. 5 shows a sequence providing a linked example of sugar, analysis and terminate operations, according to example embodiment.

Operation 405 is illustrated in greater detail below, in the description of the sequence 500 (FIG. 5). In one example, the operation 405 employs features of SAP AG software products such as COMPLIANCE CALIBRATOR version 5.0 and/or CONFIDENT COMPLIANCE version 1.2.

In operation 406, the business application manager 102 performs risk mitigation. In one example, this operation is triggered automatically whenever the business application manager 102 detects (in operation 405) that a user's proposed role change would violate the risk framework 114. Mitigation is an action to address a violation of the risk framework 114. A mitigation control exempts or overrides an identified risk or prospective audit exception, permitting it to occur even though it violates the risk framework 114.

Having selected a specific risk framework 114 violation, the approver can override the violation with a management approval that is captured in the system to maintain an audit trait. Some examples of mitigation controls include limiting existence of a new or changed role to a given time period (i.e., planned expiration of the role), automatically generating reports on activity concerning the role, etc.

Another example is useful in a small office, where many of the risky combinations must performed by one person because it is not possible to segregate the risky tasks. Here, one example mitigation operation 406 offered by the business application manager 102 is to program the real-time agents 104a-108a to alert the business application manager 102 when this person executes these risky combinations. In turn, the business application manager 102 prompts the person's supervisor to ask for transaction supporting documentation to ensure the occurrence is legitimate. In another example, the manager 102 and real-time agents cooperatively generate a detail report of changes which can be reviewed by a supervisor (or other person whose role includes the risky combination) on a routine basis and compared to supporting documentation. In another example, the business application manager 102 and real-time agents only allow the risky combinations to be approved for a limited period of time, for example while the designee is assuming tasks for another person who is the other half of the risky combination. In this case the business application manager 102 and real-time agents may be programmed to alert the person when the limited period is up, and automatically remove his/her access.

In addition, the mitigation procedure 406 may be configured to notify a "supervisor" or third person of an event, in order to begin remediation actions.

Because this is system intelligence gathered, the decision can be made to notify a person specified in the control in one location as opposed to another based on who has executed the combinations independent of the system location. This enables one common mitigating control to be utilized to control risks the same way but notify different individuals to execute based on the person who is found to have actually executed the combination. In another example, in mitigation 406 the business application manager 102 issues a command to record the mitigating control for the current user to manage the risk detected with a pre-approved alternative control. In one example, implementation of the mitigation operation 404 employs features of the COMPLIANCE CALIBRATOR software product of SAP AG.

As described above, the procedure 406 benefits from the real-time agent architecture in numerous ways, such as by obtaining substantially real-time access to data in the subsystems 104-108. Moreover, the real-time agents can be used to report incidents that take place when two risky combinations actually take place, as opposed to reporting that such a combination is theoretically possible. The real-time aspects enable the system 100 to provide an embedded remediation solution for those risky combinations that must exist because of certain business limitations discussed above. Another advantage is that, upon creating an exception for an individual to have the risky access, there is a monitoring mechanism in place immediately to report incidents of their execution on a real-time basis as they occur.

In operation 407, the business application manager 102 performs simulation. In one example, this operation is triggered automatically when the business application manager 102 detects (in operation 405) that a user's proposed role would violate the risk framework 114. As another option, the user may initiate operation 404 manually by request.

In simulation 407, the supervisor, manager, or other role approver proposes various hypotheticals, and the business application manager 102 determines whether this would violate the risk framework 114. For example, the hypotheticals may specify the details of a given role addition, role modification, role assignment, mitigating condition, etc. Advantageously, like the cross-application analysis of operation 405, the simulation of operation 407 may similarly perform bundling and other techniques to perform cross-application analysis of risk involved in the hypothetical situation. In one example, implementation of the simulation operation 407 employs features of the CONFIDENT COMPLIANCE and COMPLIANCE CALIBRATOR software products of SAP AG.

The procedure 404 benefits from the real-time agent architecture described above, for example, by obtaining substantially real-time access to data in the subsystems 104-108, therefore providing an up-to-date and extremely accurate simulation.

Risk Termination: In operation 408, the business application manager 102 performs a risk termination process.

In particular, when a user-proposed role change or addition violates the risk framework 104 (operation 405), then operation 408 either (1) allows the role change despite the risk, but notifies someone about the role change, or (2) prevents the role change from being consummated. The specific actions of operation 408 are discussed in greater detail below with reference to the sequence 500 (FIG. 5). In one example, operation 408 may employ the COMPLIANCE CALIBRATOR software product of SAP AG.

Confident Compliance: As mentioned above, the role management operation 404 and its sub-processes 405-408 help ensure that the roles 104b-108b of any one business application subsystem 104-106 do not violate the risk framework 114, and that the roles 104b-108b do not present any cross-platform risk exposure. Nevertheless, it is still conceivable that roles could be defined in some situations that still present the potential for violating the guidelines 160. For example, due to mitigation controls (406), some otherwise prohibited transaction combinations are allowed, but it is desirable to have management monitor such transactions to make sure they never exceed a given tolerance. Another example is where roles containing many capabilities have to be allowed for emergency situations. In these cases the roles would be constructed with violations; however, there would be a mitigating control surrounding the approval of these roles for assignment to individuals for emergencies only.

The confident compliance process 412 addresses these and other such possibilities. Broadly, in the confident compliance operation 412, the business application manager 102 monitors the subsystems 104-108 for prescribed conditions. Based upon the results of this review, the business application manager 102 then issues one or more reports, and may further initiate designated follow up action by designees. The procedure 412 benefits from the real-time agent architecture described above, by obtaining substantially real-time access to data in the subsystems 104-108.

Initially, the trigger (402) for confident compliance 412 is invocation of the process by an authenticated user, such as a qualified manager. At this time, the user-manager interacts with the business application manager 102 to define conditions to be monitored in the subsystems 104-108. Namely, the user specifies items to be monitored, such as desired tasks 104c-108c, roles and assignments 104b-108b, master data (e.g. customers and vendors), subsystem configuration options, changes to system configuration options, etc. The user may also specify actions to be taken whenever these conditions occur, such: (1) generating reports, and the format, content, and recipients of such reports, (2) preparing a log or other audit trail to be created, (3) invoking human workflow whenever certain conditions occur, such as starting role management (404) or mitigation (406) or another process, etc., and/or (4) working with native software of the subsystems 104-108 to stop or prevent certain actions from occurring.

After this initial setup, confident compliance 412 is re-triggered (402) when any of the specified conditions occur. Namely, the real-time agents 104a-108a (as programmed by the business application manager 102) detect the given conditions and report their occurrence to the business application manager 102, whereupon the business application manager 102 takes the pre-specified actions, such as generating a report, preparing a log, invoking human action.

In addition to the user-specified conditions, confident compliance 412 may monitor the subsystem 104-108 for occurrence of default or system-specified conditions, such as known weak points, typically troublesome areas, deficiencies that have especially severe consequences, etc. Responsive to these conditions, the process 412 may perform similar follow up actions as in the case of user-specified conditions, e.g., generating a report, preparing a log, invoking human workflow, stopping action from occurring, etc.

As a further example, upon detecting specified tolerance or conditions, a real-time agent may generate a remediation case and workflow it to a designated person or group via the business application manager 102. The business application manager 102 then documents the case as to the actions or justifications for the exception. Here the remediation is initiated and tracked within confident compliance 412 to make sure the exception is either corrected or adequately justified before the case is closed.

As another example, if an administrator initiates a configuration change to stop the detection of duplication payments in one of the subsystems 104-108 (in violation of company guidelines 160), the relevant real-time agent 104a-108b detects this, reports it to the business application manager 102, and automatically acts to prevent the change before being implemented in the local subsystem.

According to one aspect, then, confident compliance 412 is useful to pinpoint bottlenecks and chokepoints in business processes by setting tolerances and thresholds for processes to be monitored on a real-time, continuous basis.

Confident compliance 412 may, for example, monitor prescribed hot spots & holes in the business application monitoring mechanism, and also to observe additional, management-specified criteria. The operation 412 also increases visibility into control effectiveness by monitoring master data, configuration, and transactions in key business processes. Optionally, the operation 412 may provide role-based dashboards to give managers and auditors instantaneous access to the control deficiencies. Confident compliance 412 may be implemented to provide further include features such as (1) built in master controls for procure to pay, order to cash, finance, (2) automated and consistent testing, (3) integration with control repository, (3) pinpointing of exceptions and related transactions and docs, (4) remediation workflow and tracking, and (5) others.

In operation 414, the business application manager 102 provides one or more output reports.

This may involve reporting on the status, configuration, transaction history, usage, current tasks 104c-108c and/or roles and assignments 104b-108b, or other properties of the business application subsystems 104-108 or their subcomponents, or the risk framework 114, configuration 122, etc. The reports 416 may be generated on-demand, or automatically in response to designated reporting criteria.

Advantageously, reporting 416 benefits from the real-time agent architecture described above, by obtaining substantially real-time access to data in the subsystems 104-108.

In addition to those operations 412-414 specifically addressed above, the business application manager 102 may be expanded or modified to perform numerous tasks 416 within the given environment 100.

Risk Terminator: As mentioned above, the business application manager 102 receives and processes users' requests to add and change roles over time (in operation 404), and thereby build, refine, revise, and update role collections 104b-106b over time. FIG. 5 shows a sequence 500 providing a linked example of the triggering (402), analysis (405), and terminate (408) operations. Although the sequence 500 may be implemented in a broader context still, the following description is made in the specific environment of FIGS. 1-2 for ease of explanation.

In operation 502, the business application manager 102 receives notification of a role change request, and namely, a user request to modify an existing role or to add a new role to one of the records 104b-105b, change authorization data, add or change profiles, etc. More specifically, this occurs as follows. First, a user operates an interface (such as 124) to submit a request to change or add a role. For example, a manager, supervisor, or other role approver may operate the user interface 124 to submit a request to the business application subsystem 104, in order to add a role for a new hire, or to associate a new person with an existing role. The real-time agent 104a, while continuously using the sense module 210 (FIG. 2) to sense (operation 310, FIG. 3) certain activity in the business application subsystem 104, detects the role change request.

Responsive to the sensed role request, the programming 202 directs the module 213 to report (operation 313, FIG. 3) the role change request to the business application manager 102. The business application manager 102 receives this report in operation 502. Advantageously, the business application manager 102 receives notice of the role change request in real-time because it is reported by the real-time agent 104a, which is embedded into the software of the business application subsystem 104.

The sequence 500 is restarted at 502 whenever the business application manager 102 receives another role request, and therefore runs continuously. In operation 503, the business application manager 102 directs the real-time agent 104a to obtain all applicable information from the subsystem 104, in order to fully process the request.

The business application manager 102 identifies the information by name, type, function, or other high level designation. In response, the programming 202 invokes the do module 212 to cross-reference the requested information against the map 220, to determine where this information is actually stored in the subsystem 104. Then, the programming 202 invokes the gather module 211 to retrieve the information so identified. With this information in-hand, the programming 202 invokes the report module 213 to send the gathered information to the manager 102.

In operation 504, the business application manager 102 applies the risk framework 114 to the information gathered in operation 503, in order to evaluate whether the role request violates the risk framework 114. This operation is performed according to operation 705 as discussed above.

In operation 505, the business application manager 102 determines the appropriate action to take based upon the results of operation 504. If operation 504 did not find any risk posed by the requested role change, operation 505 proceeds via 505a to operation 506. In operation 506, the business application manager 102 instructs the real-time agent 104a to permit, carry out, or cooperate in implementing the requested change to the roles 104b.

In contrast, if operation 504 found a risk violation, then the manager 102 performs one of the following operations based upon the configuration settings 122: (1) allow the role change request and notify someone (507), or (2) terminate the role change request (505). The choice between paths 505b and 505c is determined by the default or user-selected settings in the configuration 122. In one example, these settings may prescribe a choice to always select one or the other of paths 505b-505c. In another example, the settings 122 may prescribe a manner of choosing between paths 505b-505c based upon the nature of the risk, type of violation, or other conditions or context.

If path 505b is chosen, the business application manager 102 allows the requested role change in operation 507. Namely, the business application manager 102 instructs the real-time agent 104a to permit updating of the roles 104b as requested. The programming 202 therefore refrains from invoking the do module 212 to block the requested role change, which would occur if path 505c were chosen. Despite allowing the role change, the business application manager 102 takes additional actions by identifying and then notifying an appropriate individual appropriate to the role, role change requester, related business unit, IT system, etc. The notification may be sent to a manager, IT administrator, supervisor, risk management personnel, etc. The report of operation 507 may, for instance, contain a listing of all risk that were violated, such as the applicable listings from 114a or I 14c; moreover, in preparing this report, the manager 102 may command the relevant real-time agents 104-105 to gather additional, required information from the subsystems.

Also in operation 507, the business application manager 102 may take further action, such as requiring the user (who requested the role change) to enter comments into a log, transaction history, or other audit trail correlated with the role change, Alternatively, operation 507 may command the real-time agent 104a to automatically create or update such a log.

In contrast to operations 505b/507, the business application manager 102 in operation 505 prevents the requested role change from occurring. Namely, the business application manager 102 instructs the real-time agent 104a to block updating of the roles 104b. In one example, the real-time agent 104a carries this out by invoking the do module 212. More particularly, this may be carried out by utilizing exits and standard entry points into the native system of 104, or by taking control over the entire native system and stopping, aborting, or truncating the role change process completely, in the context of an SAP subsystem 104, the real-time agent 104a prevents transactions such as SUO1, SUb, and PFCG from executing.

In another example, operation 505 may involve the business application manager 102 preventing an administrator from entering an exception to business rules of risky combinations or sensitive access attributes. In another example, operation 505 may stop a proposed assignment of a role to a given user in one subsystem 104-105 where that role, considered with the existing assignment of another role to the same user in another subsystem, would create a segregation of duties violation.

Optionally, in operation 505 the business application manager 102 may take the additional operation of transmitting notification of the proposed but failed role change to an appropriate destination as described above. As a further option, following a prevented role change (operation 505), the business application manager 102 may lead the user into a remediation operation 510. Remediation is discussed in greater detail above (e.g., ref. 404, FIG. 4).

As an alternative to operation 502 as described above, this operation 502 may act before the user ultimately submits a role change request. For instance, the real-time agent 104a may act to sense whenever transactions are being added to roles and notify the business application manager 102 (operation 502) even before authorization objects are defined.

In this case, the business application manager 102 analyzes (504) the incomplete role as it is being constructed by the user, and alerts the user (not shown) to potential violations, giving the option to continue onto authorization object definition or not. This provides the user with an option to discard the changes so far, before they spend a lot of time on a role change will ultimately fail.

As an alternative or additional implementation of the risk terminator features the business application manager 102 may sense and terminate activities other than changes roles and assignments. For example, the business application manager 102 may treat circumstances where a user requests to modify a task that s/he is permitted to perform by his/her roles and assignments, or the user requests to perform one or more tasks that violate the guidelines, or the user requests to perform tasks outside the users' existing roles. Here, the real-time agents 104a-105a provide substantially real-time notification of users' requests to perform tasks in the business application subsystem. And, responsive to the notifications, the business application manager 102 employs the risk framework to determine whether requested the tasks have potential to violate the guidelines, and/or the requested tasks are outside the requesting users' roles 104b-105b. If either of these is true, the business application manager 102 directs the appropriate one or more real-time agents 104a-105a to act in substantially real time to prevent the business application subsystem from carrying out the tasks. Or, the business application manager 102 allows the affected business application subsystems to carry out the tasks and transmits substantially real-time notification of the tasks to a supervisor or other designee.

As mentioned above, one aspect of the system 100 involves local business application subsystems (such as 104-105) capable of performing various user tasks (104c-105c), yet regulating user performance of these operations according to defined roles and assignments (104b-105b). Also as mentioned above, another aspect of the system 100 involves central components (102) monitoring and carefully regulating, supporting, and augmenting changes to the roles and assignments, In carrying out this aspect, the risk framework 114 is used to determine whether or not role/assignment changes are permitted or not.

With this context in mind, a further aspect of the system 100 involves a process of constructing the risk framework 114. This process may be used for initially generating the risk framework 114 as well as revising, expanding, or updating the risk framework 114. The sequence 600 (FIG. 6) illustrates an example of this process. For explanatory purposes, the sequence 600 is discussed in the context of the system 70. The sequence 600 is nevertheless applicable in a number of different implementation settings without limitation.

Figure 7:
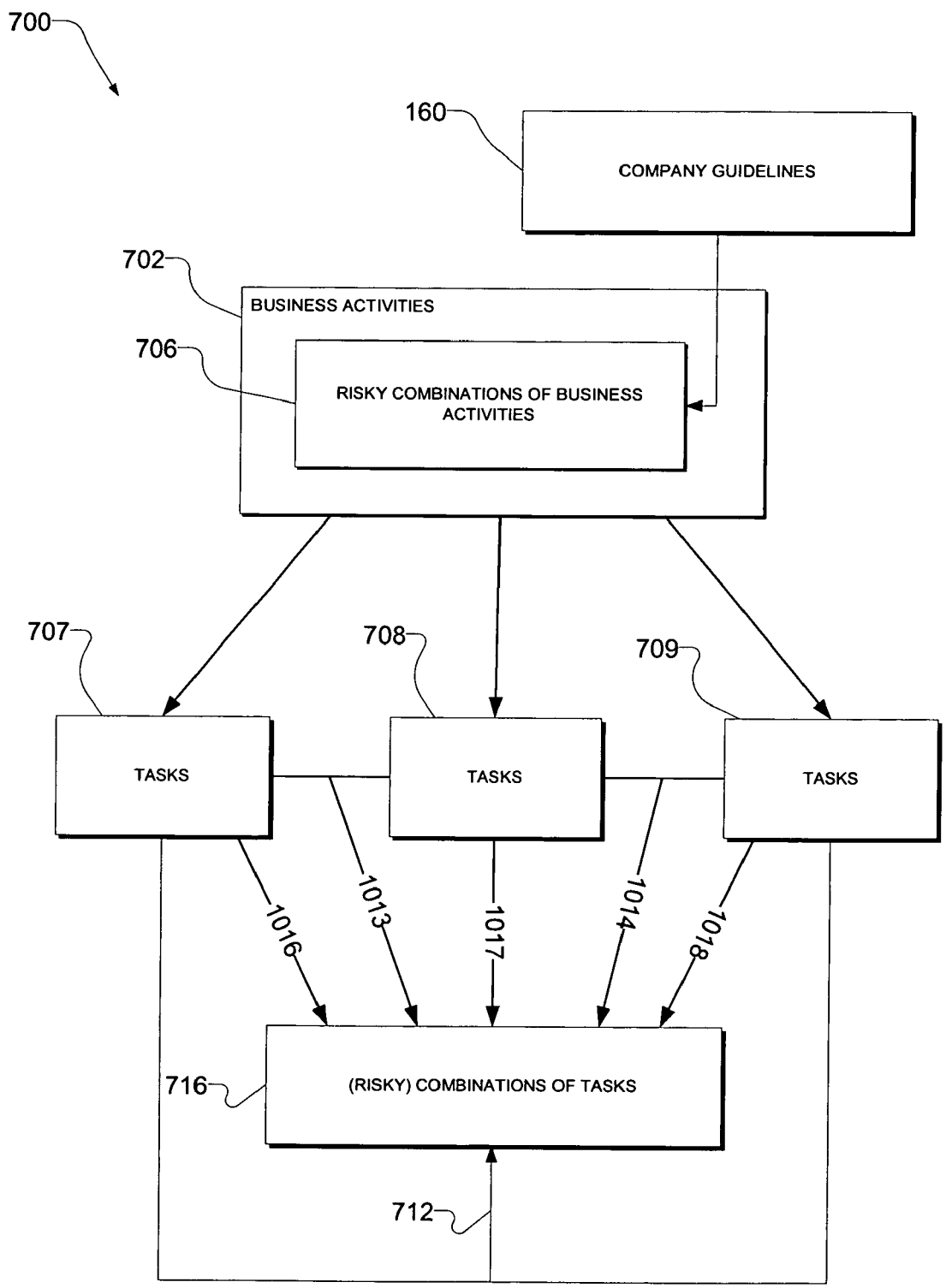
FIG. 7 illustrates the relationship between company guidelines, business activities, and business application subsystem-specific task, according to an example embodiment.

To aid in discussing the sequence 600, FIG. 7 illustrates the relationship between company guidelines 160, business activities, and business application subsystem-specific tasks. To start, FIG. 7 includes a depiction of the company guidelines 160 from FIG. 1. A library, collection, assortment, menu, or other selection of business activities is shown by 702. Broadly, business activities refer to high level business operations that are capable of being carried out by the specific tasks 104c-108c of the business application subsystems 104-108.

A subset of the business activities 702 is shown by 706, which represents risky combinations of business activities. In particular, the activities 706 prescribe various combinations of two or more business activities that present risk if entrusted to the same person. The "risk," more specifically, refers to the presence of a potential for violating the prescribed company guidelines 160. Different company policy violations may be assigned different levels of risk, such as low, medium, and high. These ratings may be based upon objective factors such as the severity of the risk to the entity if exploited, or other standards regardless of individual personal opinions. These ratings may be set by default, or by the business owner, or a combination of both. Some example risk levels include: 1. High—Physical or monetary loss or system wide disruption can result, such as fraud, system failure, asset loss, etc. 2. Medium—Data integrity or manipulation or multiple system disruption can occur, with some examples including overwriting master data, bypassing business approvals, disrupting multiple business process areas, etc.3.—Productivity losses or system failures affecting a single unit or operation can result with some examples including misstatement of internal project costs or system outage for one plant or location.

Tasks 707-706 represent the entire realm of business application subsystem specific tasks that could possibly be invoked in carrying out the business activities 702. In the present example, the tasks 707-706 correspond to machine-executable tasks 104c-108c (respectively) that can be carried out by the subsystems 74-78. Broadly, these tasks 707-706 include transactions (e.g., in an SAP subsystem), functions (in an ORACLE subsystem), components (in a PEOPLESOFT subsystem), or other tasks appropriate to the subsystems in use. "Tasks" 707-706 may be defined, however, with differing degrees of granularity. For example, in the case of a business application subsystem using SAP, a "task" may be (1) an action, or (2) an action plus a permission such as update, create, display, etc., or (3) an action plus a permission plus one or more further items of further detail such as documents, fields, etc.

Since the high level notion of "business activities" 702 only has tangible meaning in the subsystems 74-78 insofar as the subsystems can perform the detailed tasks 707-706, a subset of the tasks 707-706 therefore corresponds to the risky subset 706 of business activities. The risky task combinations are shown by 716. These risky task combinations 716 may arise from various intra-subsystem task combinations (as illustrated by 716-718), as well as inter-subsystem task combinations (as illustrated by 712-714). In one example, the risky task combinations 716 provide an example set of local manifestations in fulfillment of 114c (FIG. 1).

Figure 6:
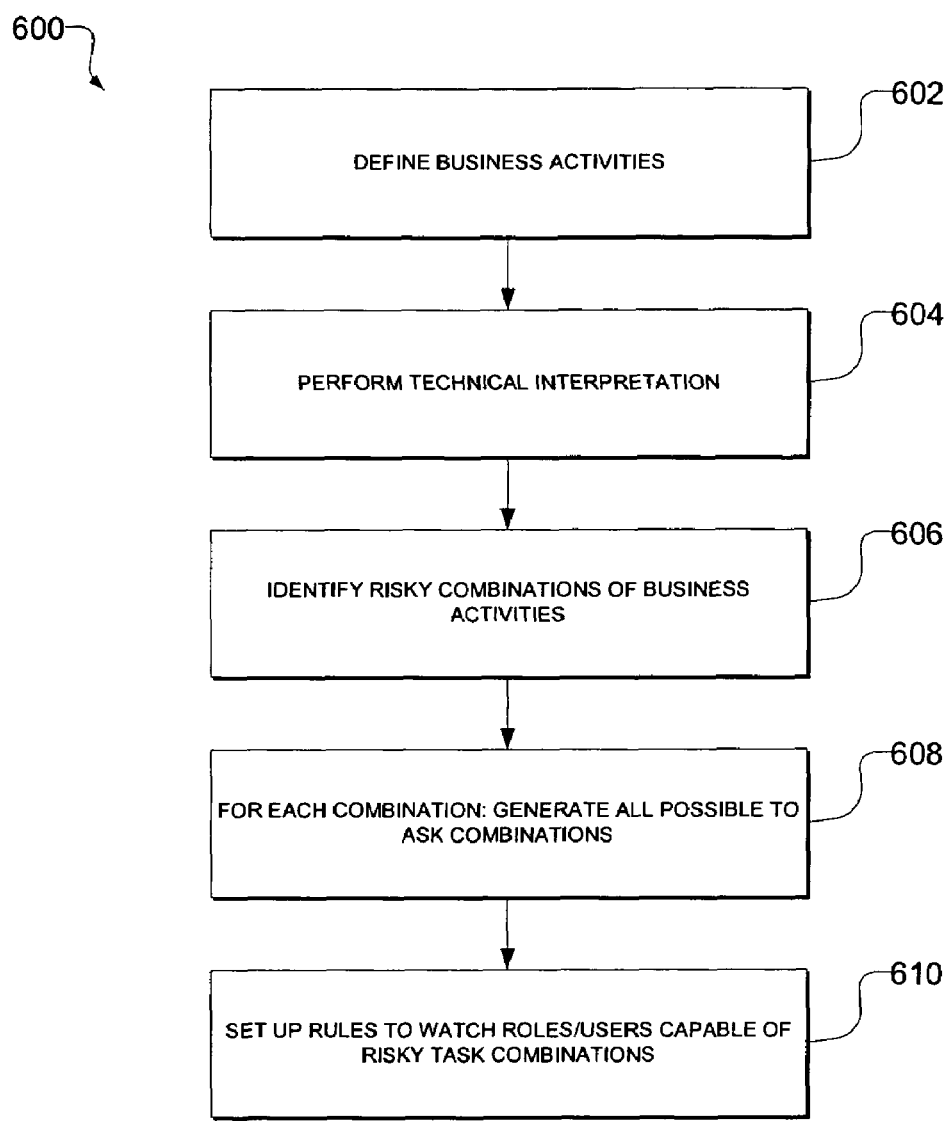
FIG. 6 shows a sequence for constructing the risk framework, according to an example embodiment.

Referring to FIG. 6 (along with FIG. 7), the routine 600 shows an example sequence for constructing the risk framework 114. In operation 602, business activities 702 are defined. In one example, this involves determining which business activities the business application subsystems 74-78 are capable of carrying out. In one example, operation 602 may be carried out upon reflection of an operational business application subsystem. In another example, operation 602 may be performed in the initial stages when designing a business application subsystem from scratch. In either case, operation 602 may be performed manually, and more particularly, by a programmer, system administrator, designer, software architect, or other appropriate person. In one example, a user operates the interface 126 (for example a GUI feature) to enter the business activities 702 to the business application manager 72.

Operation 604 provides a technical interpretation of the business activities 702, including the possible ways in which each business activity may be carried out in each business application subsystem. More specifically, for each business application subsystem, operation 604 lists all business application-subsystem specific machine-implemented tasks 707-706 capable of carrying out the business activities. There may be numerous different ways to carry out a given business activity, each of which is considered. Operation 604 may be carried out manually, and more particularly, by a programmer, system administrator, designer, software architect, or other appropriate person. In one example, a user operates the interface 126 (for example a GUI feature) to enter the tasks 707-1006 and to correlate each business activity 702 with its corresponding tasks 707-706.

As mentioned above (FIG. 7, 707-709), "tasks" may be defined with differing degrees of granularity. For example, in the case of a business application subsystem using SAP, a "task" may be (1) an action, or (2) an action plus a permission such as update, create, display, etc., or (3) an action plus a permission plus one or more further items of further detail such as documents, fields, etc. Operation 604 operates differently, then, depending upon the task granularity with which the system 70 has been setup. Therefore, in performing operation 604's technical interpretation, each business activity is broken down as needed to reach the full granularity. For instance, if a "task" merely corresponds to an SAP action, then, operation 604 breaks each business activity down into tasks, and further specifies the relevant permissions, documents, and fields, If a "task" represents to an SAP action plus permission plus document and field, then operation 604 breaks each business activity down into tasks.

Operation 606 identifies combinations 706 of business activities 702 that are risky. Namely, operation 606 identifies combinations of business activities that, if all were to be entrusted to the same person, that person would have the capability of using the system 70 in a manner that violates the company guidelines 160. If a single person were capable of carrying out these business activities, for example, that person would be capable of achieving a violation according to Table 3, and therefore capable of violating the prescribed segregation of duties rules. Operation 606 is carried out manually, and more particularly, by a programmer, system administrator, designer, software architect, or other appropriate person. For example, a user may complete operation 606 by operating a GUI feature of the interface 126 to communicate with the business application manager 72 and identify various combinations of business activities submitted in operation 602.

After operation 606, operation 608 executes. For each identified risky combination (706) of business activities (from 606), operation 608 performs computer-driven operations of utilizing these combinations' technical interpretations (from 604) to generate all possible combinations of business application subsystem-specific tasks capable of carrying out the risky combination. In other words, operation 608 uses the results of operations 604 and 606 to map the risky business activities 706 into all of the various ways that these may occur in the business application subsystems 74-78. The result is a listing 716 of risky combinations of business application subsystem tasks. Operation 608 considers the possibility that each risky business activity 706 may occur within a given business application subsystem (e.g., 716-718), as well as the possibility that risk business activity 706 may occur across multiple business application subsystems (e.g., 712-714). In a specific example, one function of operation 608 may be to assign appropriate functional level codes or authorization objects with suggested values.

Unlike operations 602-606, operation 608 is computer executed. In the present example, operation 608 is performed by the business application manager 72. The resulting task listing 716 may be enormous. For example, with nearly two hundred risks 706, there may be close to twenty-thousand resultant transaction combinations 716 in some systems.

After operation 608, operation 610 implements machine-enforced rules regulating user activity in the business application subsystem, these rules proscribing occurrence of any given role or user capable of performing any of the generated combinations of tasks. In one example, operation 610 is carried out by updating the risk framework 114 to reflect the results of operation 606, and more particularly, by storing the task combinations 716 in the local manifestations 114c. In single business application subsystem example (not shown), operation 610 may be carried out by programming the local business application subsystem, and more particularly, by updating a risk framework 114 local to that subsystem. This enables the subsystem to regulate user activity in the business application subsystem, proscribing occurrence of any given role or user capable of performing any of the generated combinations of tasks.

As to rules proscribing occurrence of any given role or user capable of performing any of the generated combinations of tasks, this may involve preventing such occurrences, causing notification of such occurrences, or both. Additional detail of this feature is described above in the context of the risk terminator function.

The examples above described various embodiments of business application subsystems 104-108, such as ERP subsystems, systems for compliance with government regulations, legacy data repositories, etc.

As a further example, another embodiment of business application subsystem includes data, processes, computing hardware, electronics, devices, or actions relating to building security or so-called "physical provisioning." In this embodiment, one or more business application subsystems 104-108 include various remotely operated facility security components such as door locks, alarm systems, access zones, controllers, boom gates, elevators, readers (card, biometric, RFID etc), Positive ID Readers (PIR5) and the events and alarms that are generated by these components. This can also include other devices such as photocopiers, P08 systems, HVAC systems and components, transportation access (charge) points, and other such systems that can be incorporated on smart card or other physical access technology.

In the physical provisioning context, the tasks (e.g., 104c) include acts of opening the door locks, deactivating the alarm systems, obtaining access to physical areas, operating equipment, and the like. In processing the tasks 104c-108c, the business application subsystem receives and evaluates individual user authentication from interfaces such as 124, 126, 128. User authentication may utilize keypad passcode, biometric identification (e.g., fingerprint, iris/retina scan), user name and password submittal, presentation of magnetic stripe card, proximity card, smart card, use of a radio frequency identification (RFID), etc. The business application subsystem considers information such as the user's role, assignment, and other characteristics (e.g., 104b) to determine whether to perform the requested task on behalf of the user.

Insofar as the building security aspect, the business application subsystem may employ technology such as the commercially available products of CARDAX, GE, Honeywell, or others.

In the physical provisioning context, the management of roles (e.g., ref. 704. FIG. 7) pertains to the granting and revoking access to physical areas, machinery, and the like. Similar to the roles (e.g., 104b) as discussed above, then, the physical provisioning roles are designed to prevent segregation of duties violations. For instance, risk is likely posed by a situation where the same person has access to both a chemicals storage area (ammonium nitrate for example) as well as access to the tarmac area of an airport at a connected facility. With the addition of the physical aspect, the business application manager 102 can also regulate roles to prevent segregation of duties violations across the physical and logical landscapes simultaneously. For instance, risk is likely to be posed by a situation where a person has access to a physical inventory storage area according to one role, while at the same time belonging to a role which allows them to perform inventory write-offs in an ERP subsystem. The physical aspect will also deliver data to the business application subsystem to allow it to reference rules about whether or not a person has been physically at a site for too long in one continuous time span; or if a person has not had sufficient time away from a work site between physical visits; or where a person has exceeded certain regulatory exposure limits to toxic or radioactive substances for example.

As noted above, a single entity (e.g., single company) may use multiple business applications (e.g., enterprise resource planning software, government regulatory compliance software or physical provisioning software), each of these business applications being provided from one of a variety of vendors. The use of such multiple business applications exposes the company to inter-application risks, in addition to the intra-application risks discussed above.

To address these risks, the shared business application manager 102 is described above, with reference to FIG. 1, to be coupled to various business application systems 104, 106 and 108. The manager 102 may perform operations, including analyzing and detecting risks occurring within individual business applications (e.g., intra-application risks), as well as risks across multiple business applications (e.g., inter-application risks).

The business application manager 102 centrally supervises role management, for example, across all business application subsystems 104-108, and may also perform cross-application analysis to detect a risk (e.g., a potential for violation of the guidelines 106) occurring across the multiple business application subsystems 104-108, even though no risk may be present within an individual business application subsystem.

The business application manager may further detect issues across the business application subsystems 104-108 by gathering technical information for comparison to "risky combinations", as defined within the rules framework.

Figure 8:
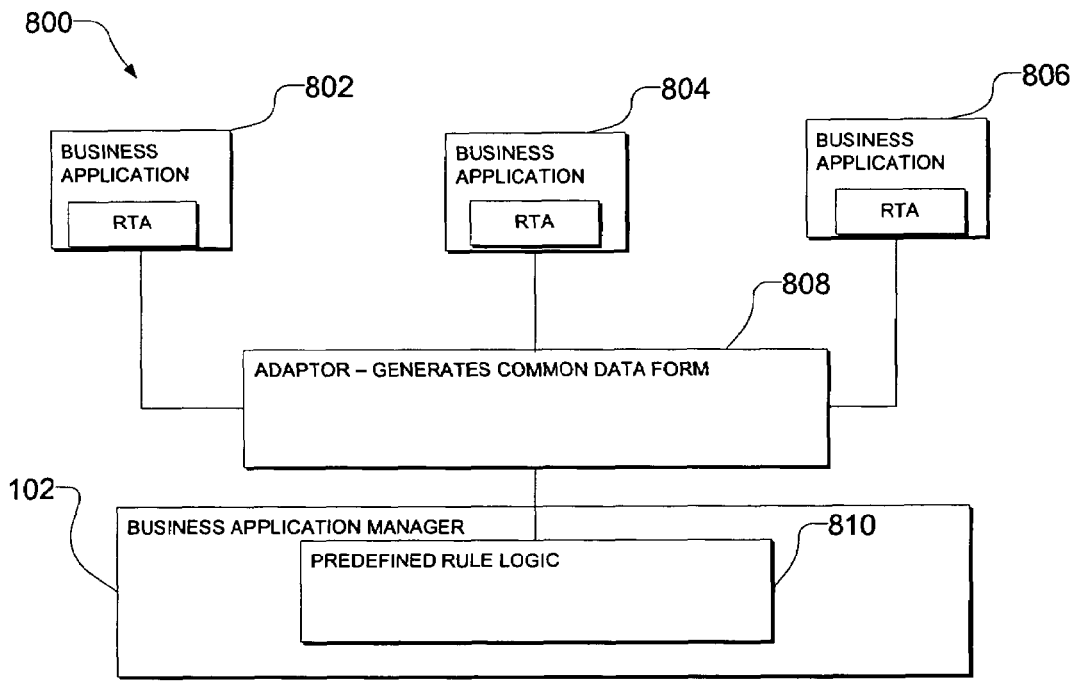
FIGS. 8 and 9 are block diagrams illustrating two approaches, according to respective example embodiments, whereby cross-application analysis to detect risk may be performed by a business application manager 102 in a business application system.
Figure 9:
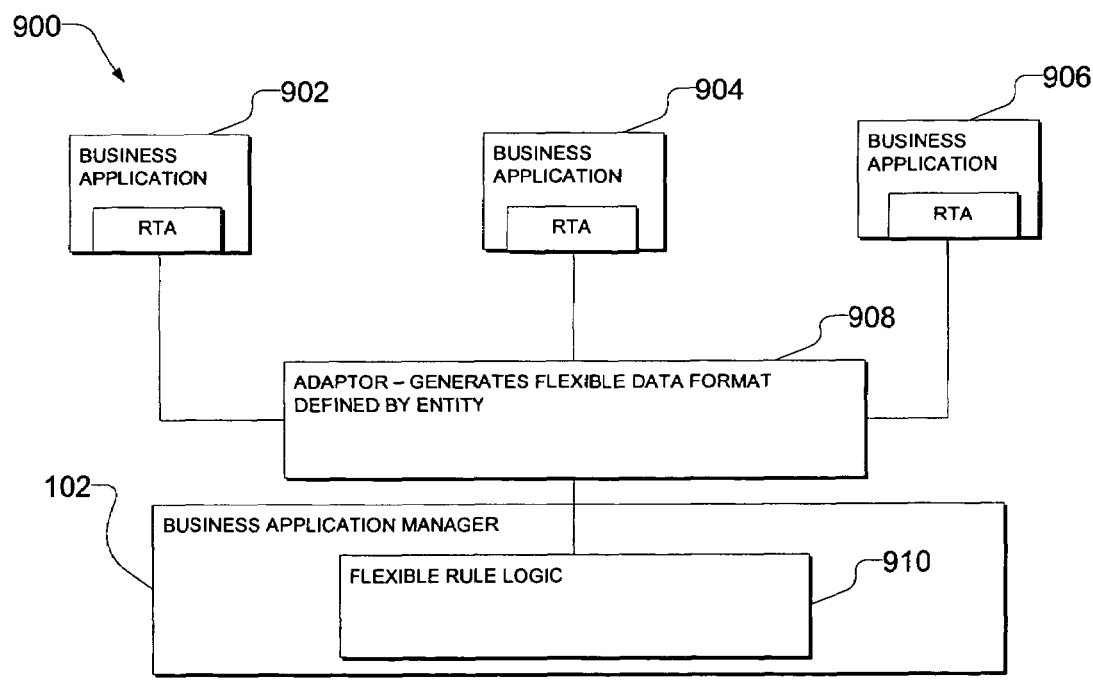

FIGS. 8 and 9 are block diagrams illustrating two approaches, according to respective example embodiments, whereby cross-application analysis to detect risk may be performed by a business application manager 102 in a business application system.

In the example system 800, an adaptor 808 gathers business application data across multiple business applications 802-806 via respective real-time agents (RTAs). The adaptor 808 then translates the collected data from the multiple business applications 802-806 into a common data format. The adaptor 808 then communicates the data, in the common format, to predefined rule logic 810 within the business application manager 102, so as to enable the business application manager 102 to make various risk assessments, as specified by the predefined rule logic 801, based on the received business application data.

The example system 900 similarly includes an adaptor 908 which operates to collect business application data, via respective real-time agents (RTAs) from multiple business applications 902-906. However, the adaptor 908, as opposed to translating the collected business application data into a common format as is performed by the adaptor 808, processes the business application data in a flexible data format that is defined by an entity (e.g., a data format that is defined by a company that executes the multiple business applications 902-906). The business application manager 102 also includes flexible rule logic 910, which is again definable by an entity, as will be described in further detail below, to perform various risk analyses based on the business application data received from the adaptor 908. Further details regarding the example system 900 are described with reference to subsequent figures.

Figure 10:
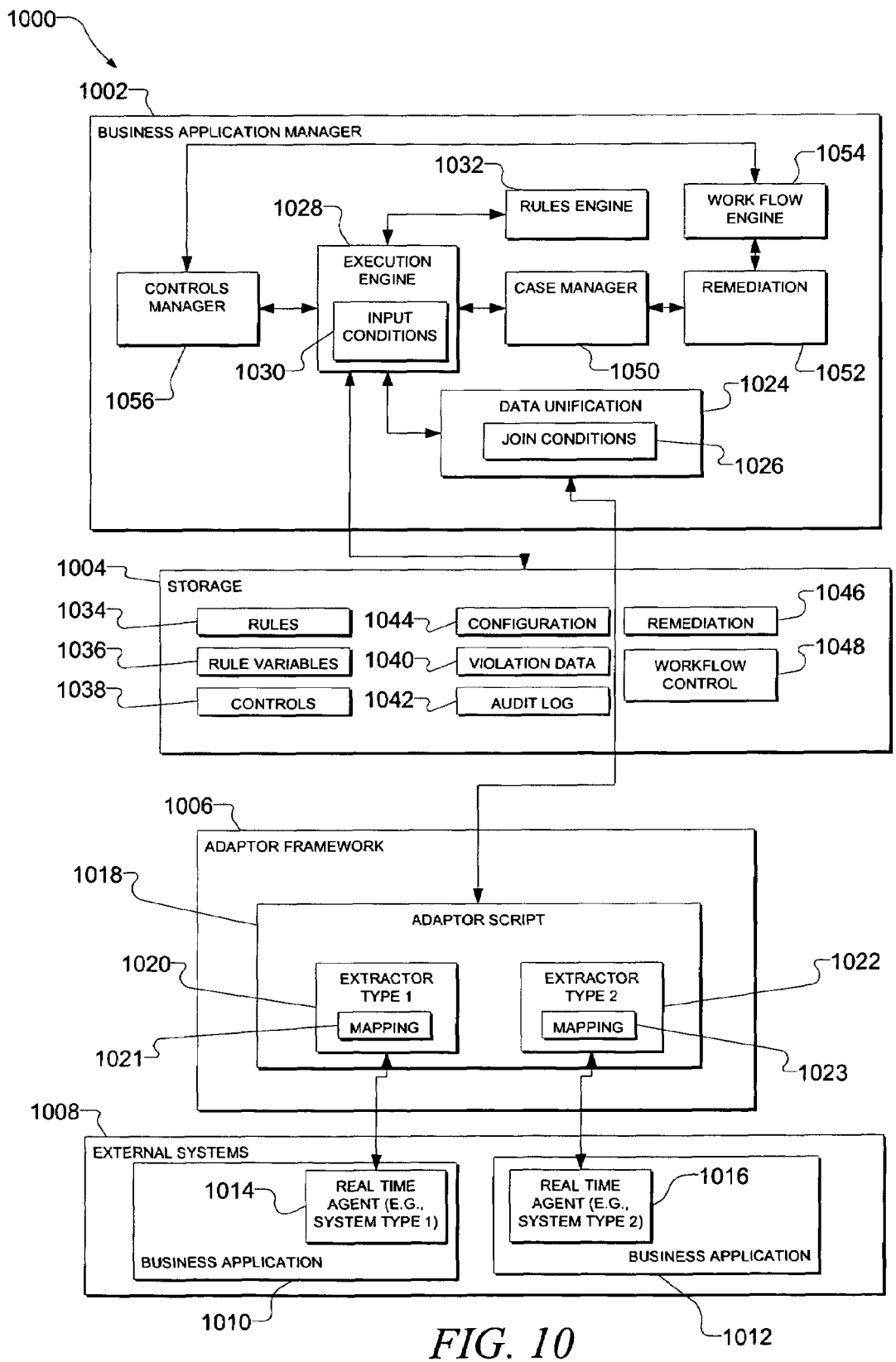
FIG. 10 is a block diagram illustrating further architectural details of a system, which may be a specific example embodiment of the system shown in FIG. 1.

FIG. 10 is a block diagram illustrating further architectural details of a system 1000, which may be a specific example embodiment of the system 100 shown in FIG. 1. The system 1000 includes a business application manager 1002 which is communicatively coupled, and has access, to storage 1004. The business application manager 1002 is also communicatively coupled to an adaptor framework 1006 that in turn interfaces with multiple external systems 1008. While FIG. 10 shows the adaptor framework 1006 as being external to the business application manager 1002. In other embodiments the adaptor framework may constitute a component of the business application manager 1002.

Starting with the external systems 1008, each of these external systems may host a respective business application 1010, 1012 which has associated therewith a real-time agent 1014, 1016. The multiple external systems 1008 may be operated on behalf of a single entity (e.g., company, partnership joint venture, corporate division, government unit etc.). Each of the business applications 1010 and 1012 may be of a different type and/or supplied by a different vendor. For example, the business application 1010 may be an enterprise resource planning (ERP) system supplied by SAP AG, while the business application 1012 may be the eBusiness Suite of Oracle Corporation. The business applications 1010 and 1012 may furthermore each be subsystems of different ERP systems. For example, one business application may be the SAPR/3 ERP subsystem from SAP AG, and the business application 1012 may be an Oracle Financials Subsystem from Oracle Corporation. Further, each of the business applications 1010 and 1012 may be customized by the operating entity to support business and operational processes of the relevant entity. As such, each of the real-time agents 104 is customized to extract business data from the relevant business application 1010, 1012, and to communicate this information to the adaptor framework 1006.

The adaptor framework 1006 is shown to comprise one or more adaptor scripts 1018, each of which may execute a number of data extractors 1020, 1022 to generate result sets from business application data received from one or more real-time agents 1014, 1016. While each of the extractors 1020 and 1022 is shown to communicate with a single real-time agent 1014 and 1016, an extractor may receive business data from a number of real-time agents, and utilize this data received from multiple real-time agents to general a respective result set. Each of the extractors 1020 and 1022 includes a respective mapping 1021, 1023 to map an attribute of a respective business application 1010, 1012 to a general and/or technical attribute of a rule variable 1036, the general and technical attributes being based on a system type of the respected business application.

Each adapter script 1018 communicates individual result sets, generated by respective extractors, to a data unification component 1024 of the business application manager 1002, the data unification component 1024 including multiple join conditions 1026 which are applied to combine a number of individual result sets, received from adaptor scripts 1018, into a combined result set.

The data unification component 1024 is coupled to an execution engine 1028, which in turn includes multiple input conditions 1030. Input conditions are flexible, and may be customized by an operator of the business application manager 1002. Input conditions may be selected by the execution engine 1028 prior to the execution of a particular rule 1034 for a specific control 1038.

The business application manager 1002 also includes a rules engine 1032 which is communicatively coupled to the storage 1004, and operates to execute rules 1034 stored within the storage 1004. Each of the rules operates with respect to one or more rule variables 1036, as will be described in further detail below. Each rule may also be associated with one or more controls 1038.

As has been described above, when a deficiency or violation is detected by the rules engine 1032 as a result of application of a particular rule 1034 to a combined result set generated by the data unification component 1024, a violation of a particular rule may be noted and included within violation data 1040. Further, an audit log 1042 may be maintained in order to enable auditing of detected deficiencies or violations. Configuration data 1044 may also be included within the storage 1004. Configuration data 104 may operate to configuration a particular rule 1034, and may be governed by a various operator types and conditions, such as for example of deficiency type (which may be defined up to three levels) and ranges (such as absolute value, percentage of either or both).

The storage 1004 also includes remediation data 1046, specifying remedial actions which may be performed responsive to detection of a procedural deficiency or a violation across the multiple business applications 1014, 1016. These remedial actions may include, for example, providing notification to a designated recipient, logging occurrence of the procedural deficiency or a violation (e.g., as reflected in the violation data 1040 and 1042), invoking an automated or human workflow to implement a particular remedy, or invoking an automated procedure to prevent occurrence of a specified deficiency or a violation. To this end, the storage 1004 may also include workflow control data 1048, which controls any remedial workflows that may be invoked.

Returning to the business application manager 1002, a case manager 1050 operates to manage each deficiency or a violation "case" that is detected as a result of a rule violation, a remediation module 1052 operates to implement the remedial action specified in terms of the remediation data 1046, and a workflow engine 1054 implements workflows as defined by the workflow controls 1048. Further, a controls manager 1056 operates to execute controls specified by the control data 1038.

Figure 11:
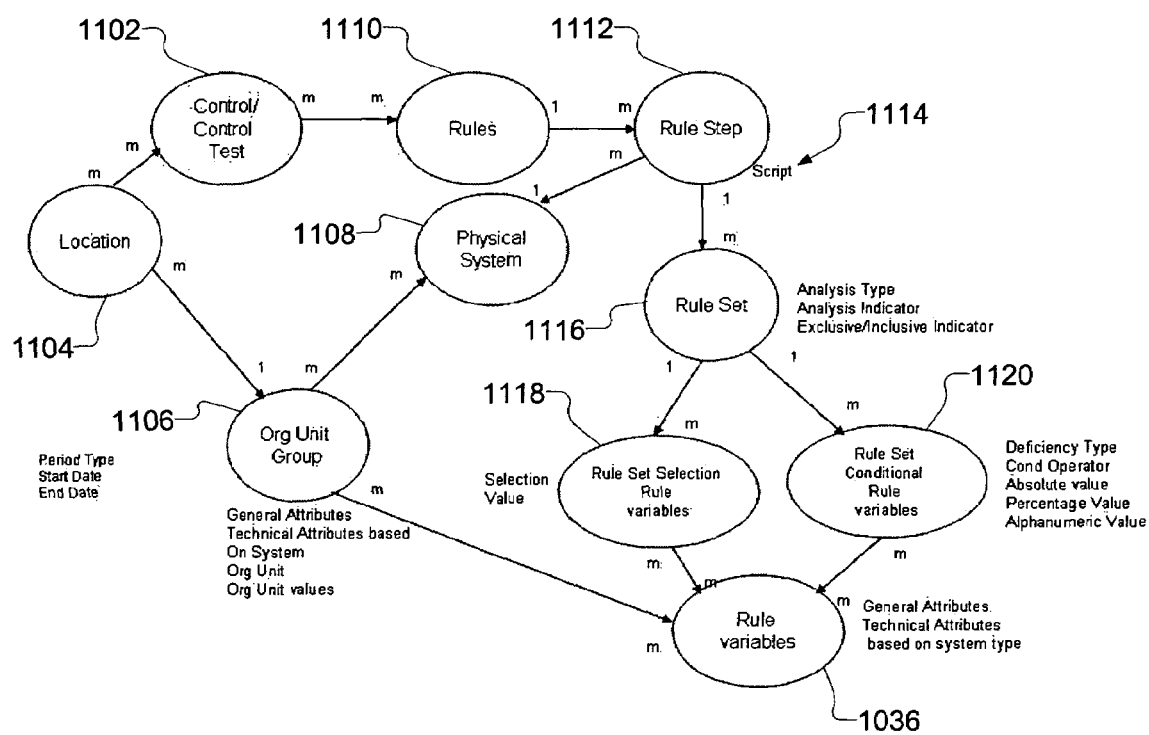
FIG. 11 is an entity relationship diagram for the rules engine, according to an example embodiment.

FIG. 11 is an entity relationship diagram for the rules engine 1032, according to an example embodiment. Starting at a high level, multiple controls 1102 may be assigned to each location 1104. Multiple locations 1104 may furthermore be associated with an organizational unit group 1106. Each organizational unit group 1106 may include a set of general attribute, and a number of technical attributes based on one or more physical systems 1108 (e.g., hosting respective business applications) that are associated with the relevant organizational unit group. General attributes may include, for example, name and description. Technical attributes may be based on one or more physical external systems 1008 (e.g., the company code and plant in an SAP system, which correspond to an "operating unit" in an Oracle system).

An organizational unit group 1106 may furthermore contain more than one organizational unit and associated organizational unit values. For a particular location 1104, an organizational unit group 1106 may have different sets of physical systems 1108, dependent upon the organizational unit values.

Each location 1104 may also be associated with a calendar (not shown) that may be used by a scheduler (not shown) of the business manager to schedule test execution by the execution engine 1028. Control testing is assigned rules within a specific timeframe.

Each control 1102 has an associated testing procedure which may be manual (e.g., testing them by users manually and the result is uploaded), semi-automatic (e.g., the control is executed automatically, but evaluated by a user), or automatic (e.g., the control is executed automatically and evaluated automatically). Further, each control 1102 may be assigned to multiple locations 1104. Accordingly, if there is a change in a control attribute for a specific location 1104, the relevant control 1102 may be copied for that location and modified.

FIG. 11 also illustrates that controls 1102 (or control tests) may be assigned to rules 1110 for a specific timeframe. A particular status may be attributed to a control 1102 to rule 1110 assignment. Only active rule assignments are used for control test execution for that specified timeframe.

Each rule 1110 in turn includes multiple rule steps 1112. Each rule step 1112 may be attached to a script 1114 and a physical system 1108. If a particular rule step 1112 is attached to a physical system 1108, then the attached script 1114 may execute in that physical system 1108. A script 1114 may be embodied as an adaptor script 1018, or may constitute a real-time agent script embodiment of a real-time agent.

Rules 1110 may also be timeframe-based, and a modification to a rule may result in the creation of a new rule version based on a particular timeframe. Each rule step 1112 in turn has one or more rule sets 1116. Multiple rule sets 1116 can be defined to use different sets of values for different result sets. Various attributes are maintained for each rule set, such as for example analysis type and analysis indicator. Examples of analysis type and analysis indicator include changes to system configuration, creation of authorized records, the existence of specific business parameters and corresponding values, a number of occurrences of changes made to a specific critical business object, and transactional data analysis.

Each rule set is in turn associated with a set of selection rule variables 1118 and a set of conditional rule variables 1120. Selection rule variables 1118 may be used for the selection of a particular result set returned by an extractor, from the real-time agents, to the business application manager 1002. Conditional rule variables 1120 may be used to check and decide on a deficiency type, deficiency types being freely definable by an operator of a system 1000. Condition rule variables may include conditional operators (e.g., if greater than a predetermined amount), absolute value variables, percentage value variables and alphanumeric value variables. An example of a conditional operator is a variable that qualifies the particular condition as met if the relevant value changes by a predetermined percentage, for example.

Selection rule variables 1118 may also have organizational unit variables. These organizational unit values may be specified as having a wildcard value (e.g., "asterisk"), and may be maintained at a location level organizational unit group. Accordingly, during controlled execution, the organizational unit values may be replaced by values from the location organizational unit group. If the organizational unit values are defined explicitly at selection rule variable value, such values will not be overwritten.

Dealing with the rule variables 136, which may constitute each of the selection rule variables and conditional rule variables, rule variables 136 may have a general attribute and a technical attribute. A technical attribute of a rule variable 1036 may define a data type and system type dependent tables/fields for getting a list of values/descriptions. Examples of data types may include character, numeric, decimal, data etc.

It should furthermore be noted that certain of the rules 1110, as noted above, may be cross-system rules that are custom built and may be executed at a local J2EE system. For cross-system rules 1110, a result set is created utilizing one ore more data extractors 1020 and 1022, and the cross-system rule is applied to the created result set.

Figure 12:
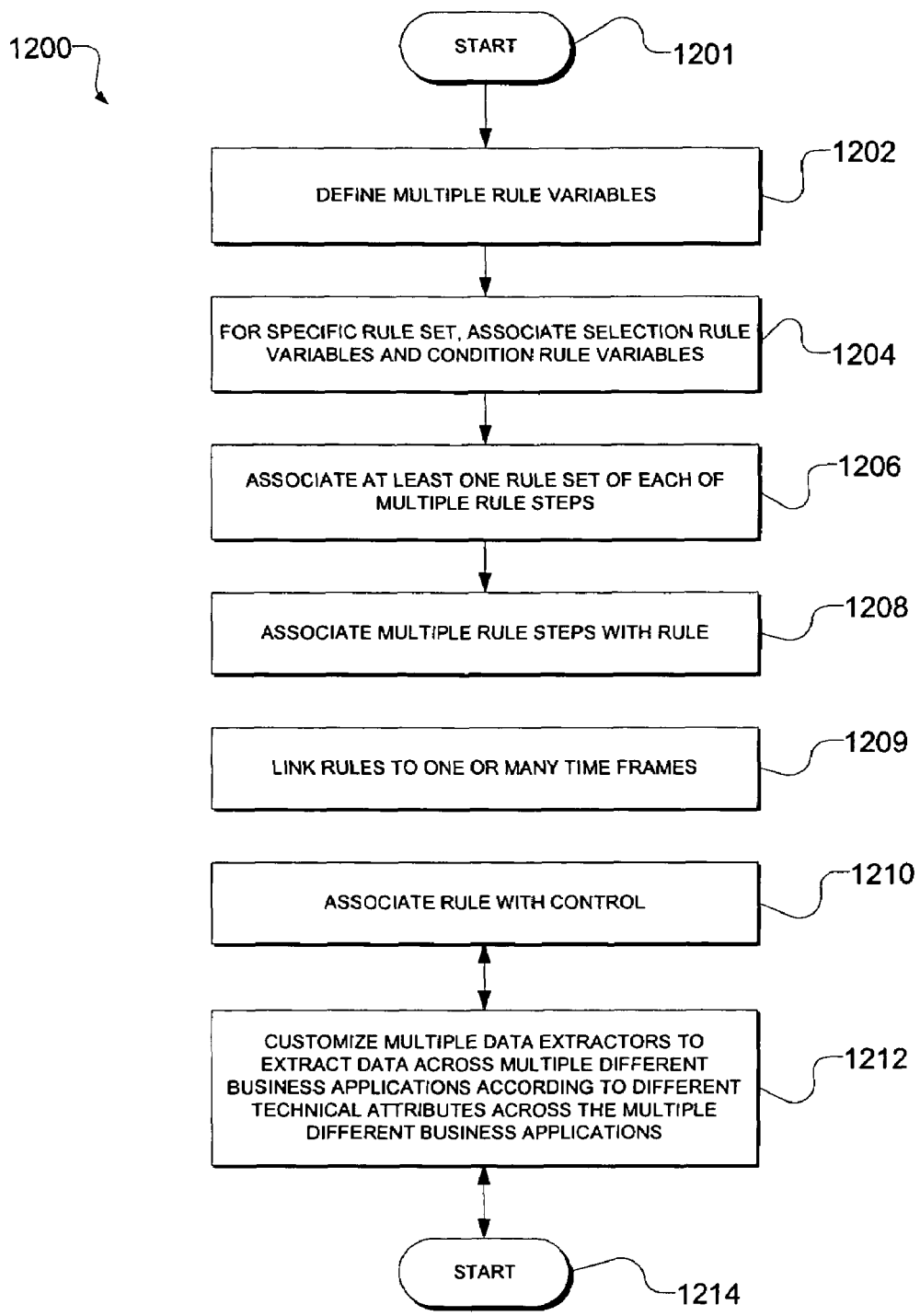
FIG. 12 is a flowchart illustrating a method, according to an example embodiment, to configure a business application environment including, for example, a business application manager and multiple business applications that are managed by the business application manager.

FIG. 12 is a flowchart illustrating a method 1200, according to an example embodiment, to configure a business application environment including, for example, a business application manager and multiple business applications that are managed by the business application manager.

The method 1200 commences at operational 1201 and progresses to operation 1202 with the definition, for example by operator of the business application environment, of multiple rule variables 1036. As noted above, the definition of the rule variables 1036 may include defining both general attributes and technical attributes, based on system types of multiple business applications 1010, 1012.

At operation 1204, the operating entity may, for a specific rule set 1116, associate selection rule variables 1118 and condition rule variables 1120 with the specific rule set.

At operation 1206, the entity may then associate at least one rule set with each of multiple rule steps 1112, which at operation 1208 are in turn associated with a specific rule 1110.

At operation 1209, a specific rule may be associated with at least one, and potentially multiple, timeframes. This association of a rule with timeframes provides flexibility in applying different rules in different timeframes. For example, a monthly rule may check a transaction amount of $5,000, whereas a quarterly rule may check an amount of $50,000. This ability to associate different timeframes with a specific rule enables the rules to be applied for both periodic testing, as well as continual monitoring.

At operation 1212, the entity may then customize multiple data extractors 1020, 1022 to extract data across multiple different business applications 1010, 1012 according to different technical attributes across the multiple different business applications. The method 1200 then terminates at operation 1214.

Figure 13:
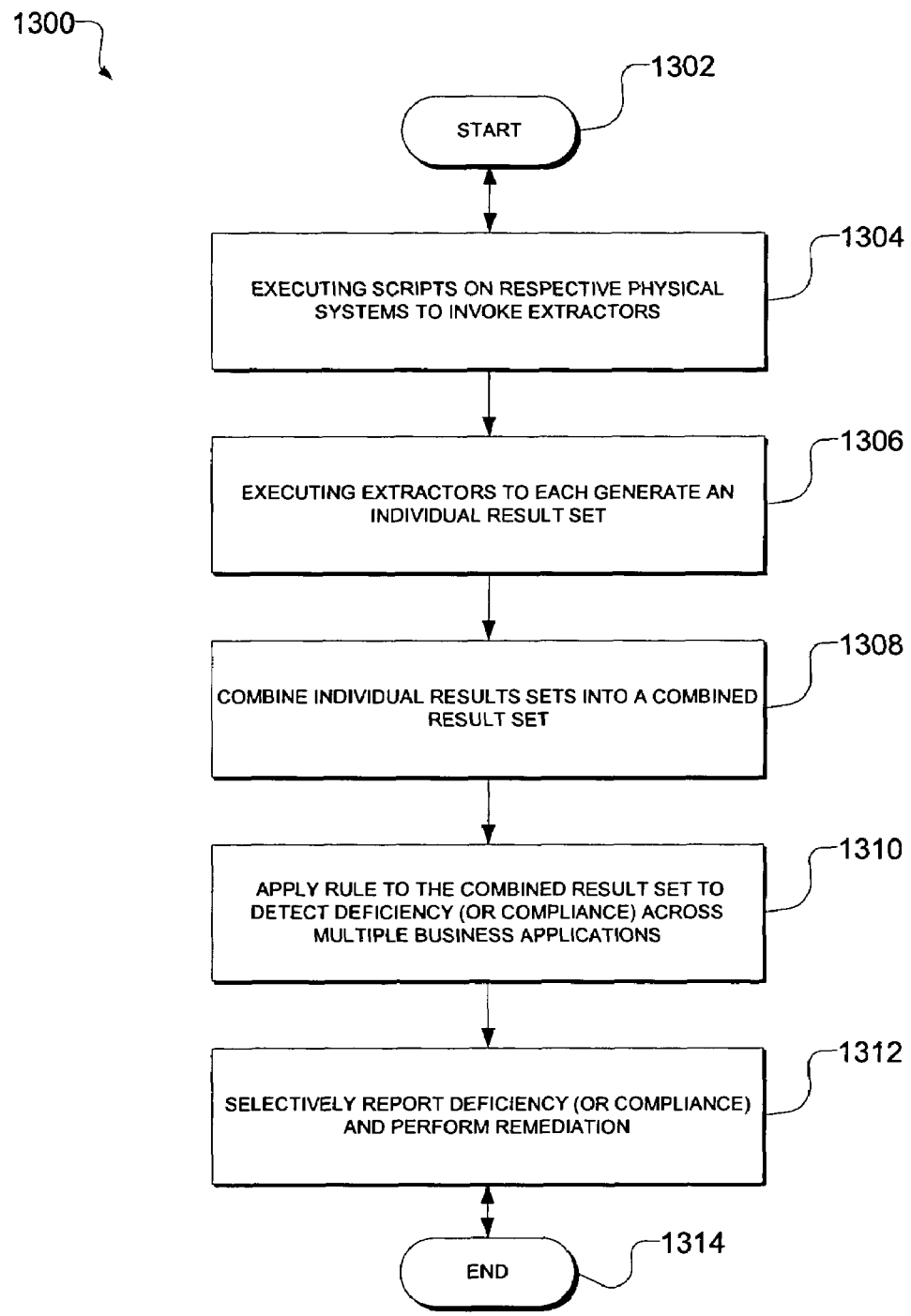
FIG. 13 is a flowchart illustrating a method 1300, according to an example embodiment, to detect a procedural deficiency, or a violation, across a plurality of business applications.

FIG. 13 is a flowchart illustrating a method 1300, according to an example embodiment, to detect a procedural deficiency, or a violation, across a plurality of business applications.

The method commences at operation 1302, and proceeds to operation 1304 with the execution of scripts 1114, associated with respect of rule steps 1112, on respective physical systems 1108 to invoke the appropriate extractors 1020, 1022. The invoking of the extractors at operation 1304 may include retrieving the extractors from the storage 1004

At operation 1306, each of the data extractors 1020 or 1022 is executed to generate a respective individual result set. To this end, each of the data extractors may interface with one or more real-time agents 1010, 1012 associated with business applications 1014, 1016 of the external systems 1008.

At operation 1308, the individual result sets, generated by multiple data extractors, are combined into a combined result set. This combining of the individual result sets may include mapping characteristic variables, utilizing the mappings 1021, 1023, to a rule variable 1036. Further, the combining of the multiple individual result sets may include, within the data unification component 1024, applying one or more join conditions 1026. Examples of a mapping of a characteristic variable to a rule variable may include a mapping of data extracted from an SAP system for a company code BUKRS, which is mapped to a rule variable COMPANY_CODE. An example of a join condition may be a joining of a material number of an SAP system (MTNR) to an item number of an Oracle system (ITEM).

At operation 1310, the rules engine 1032 proceeds to apply one or more rules 1034 to the combined result set in order to detect a procedural deficiency, violation or compliance across the multiple business application 1010, 1012. The procedural deficiency to be detected may include, merely for example, a violation of a company policy, a government regulation, a law, a professional rule, an accounting rule, a statement of good business practices, a condition imposed by a contract or a corporate article. These violations may be specified by the relevant rule 1034.

At operation 1312, the business management application 1002 may report a detected procedural deficiency, violation or compliance across the multiple business applications. To this end, the case manager 1050 may instantiate a new case, responsive to the detected event. Further, the business application manager 1002 may initiate performance of one or more remedial actions responsive to detection of a procedural deficiency or a violation. Specifically, the remediation module 1052 may initiate performance of any one of a number of remedial actions including providing notification of the procedural deficiency or violation to a designated recipient, logging occurrence (e.g., in the audit log 1042) of the procedural deficiency or violation, invoking a human or automated workflow to implement a remediation or (e.g., workflow) to prevent occurrence of a specific event. The reporting of the deficiency may include, merely for example, sending an electronic communication (e.g., email, SMS, instant message or page alert) to a designated recipient, or otherwise updating a dashboard or user interface utilized to monitor deficiencies across the various business applications.

Figure 14:
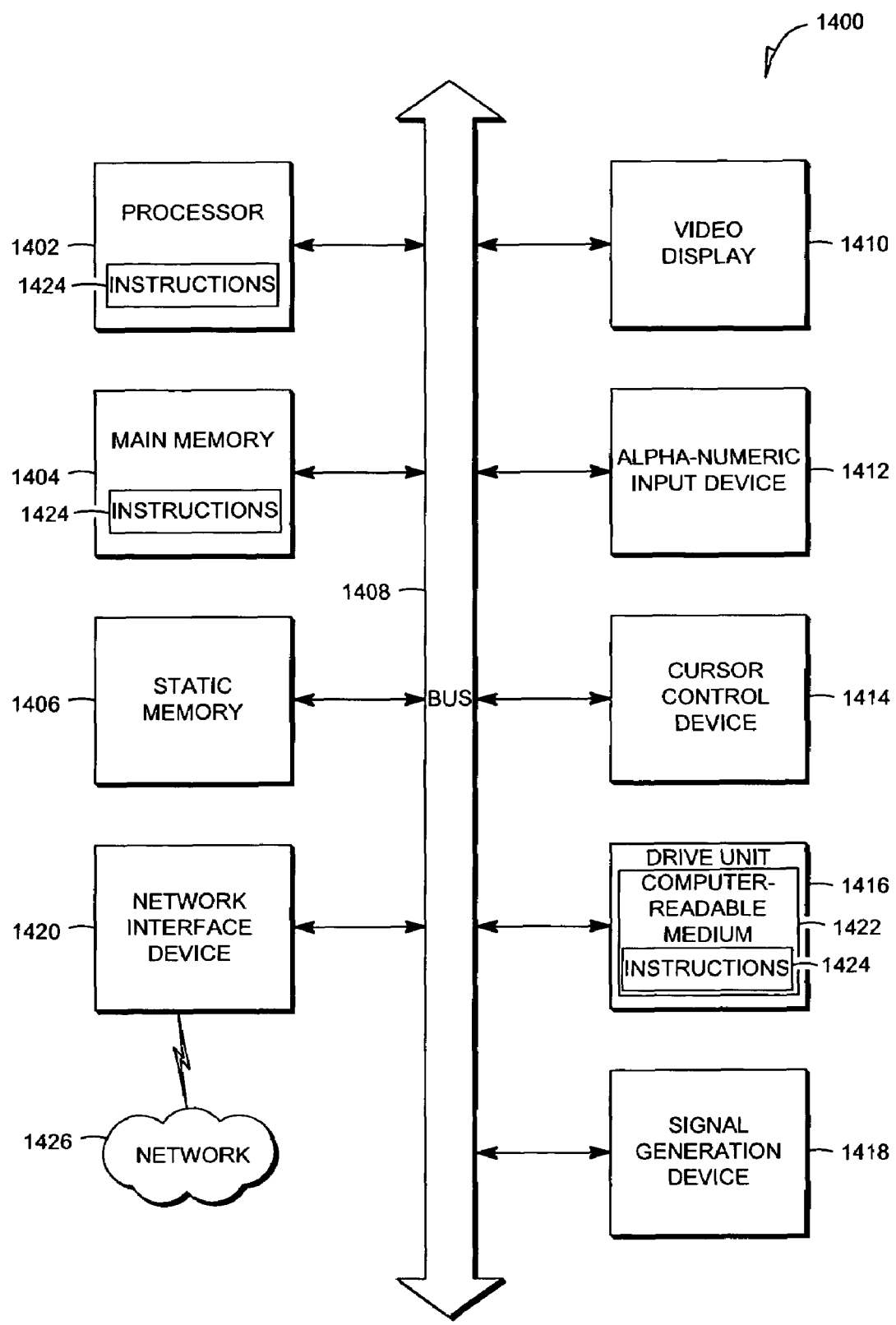
FIG. 14 is a block diagram of machine in the example form of a computer system within which a set of instructions, for causing the machine to perform any one or more of the methodologies discussed herein, may be executed.

FIG. 14 is a block diagram of machine in the example form of a computer system 1400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU) or both), a main memory 1404 and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard), a user interface (UI) navigation device 1414 (e.g., a mouse), a disk drive unit 1416, a signal generation device 1418 (e.g., a speaker) and a network interface device 1420.

The disk drive unit 1416 includes a machine-readable medium 1422 on which is stored one or more sets of instructions and data structures (e.g., software 1424) embodying or utilized by any one or more of the methodologies or functions described herein. The software 1424 may also reside, completely or at least partially, within the main memory 1404 and/or within the processor 1402 during execution thereof by the computer system 1400, the main memory 1404 and the processor 1402 also constituting machine-readable media.

The software 1424 may further be transmitted or received over a network 1426 via the network interface device 1420 utilizing any one of a number of well-known transfer protocols (e.g., HTTP).

While the machine-readable medium 1422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method operations of the invention can be performed by one or more programmable processors executing a computer program to perform functions of the invention by operating on input data and generating output. Method operations can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

The invention can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information).

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

While the foregoing disclosure shows a number of illustrative embodiments, it will be apparent to those skilled in the art that various changes and modifications can be made herein without departing from the scope of the invention as defined by the appended claims. Accordingly, the disclosed embodiment are representative of the subject matter which is broadly contemplated by the present invention, and the scope of the present invention fully encompasses other embodiments which may become obvious to those skilled in the art, and that the scope of the present invention is accordingly to be limited by nothing other than the appended claims.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process operations described herein may be implemented as electronic hardware, computer software, or combinations of both.

To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein, The abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
   retrieving a plurality of data extractors to extract data across a plurality of business applications based in part on a plurality of statements of roles and assignments associated with the plurality of business applications, each business application of the plurality of business applications having at least a respective statement of roles and assignments;
   executing the plurality data extractors to generate a plurality of individual results sets;
   combining the plurality of individual results sets into a combined result set;
   applying a rule to the combined result set to detect a procedural deficiency across the plurality of business applications based on the respective statements of roles and assignments of the plurality of business applications; and
   selectively performing a remedial action responsive to the detection of the procedural deficiency across the plurality of business applications.

2. The computer-implemented method of claim 1, wherein the executing of the plurality of data extractors includes interfacing each of the plurality of data extractors with a respective real-time agent associated with each of the plurality of business applications.

3. The computer-implemented method of claim 1, including selectively reporting detection of the procedural deficiency across the plurality of business applications.

4. The computer-implemented method of claim 1, wherein the performance of the remedial action includes at least one of a group of actions consisting of providing notification to a designated recipient, logging occurrence of the procedural deficiency, invoking a human workflow to implement the remedial action, and invoking an automated procedure to prevent occurrence of a specified event.

5. The computer-implemented method of claim 1, wherein the business application is at least one of a group consisting of enterprise resource planning software, government regulatory compliance software, and physical provisioning software.

6. The computer-implemented method of claim 1, wherein the procedural deficiency is at least one of a group of deficiencies consisting of a violation of at least one of a company policy, a government regulation, a law, a professional rule, an accounting rule, a statement of good business practices, a condition imposed by a contract, and a corporate article.

7. The computer-implemented method of claim 1, including customizing each of the plurality of data extractors to extract data from at least one of a plurality of business applications.

8. The computer-implemented method of claim 7, wherein the customizing of each of the plurality of data extractors comprises customizing each of the plurality of data extractors according to different technical attributes across the plurality of business systems.

9. The computer-implemented method of claim 1, wherein the retrieving of the plurality of data extractors comprises executing a script that invokes each of the plurality of data extractors.

10. The computer-implemented method of claim 1, wherein the combining of the plurality of individual results sets includes mapping a characteristic variable of at least one of the plurality of business applications to a rule variable of the rule.

11. The computer-implemented method of claim 10, wherein the combining of the plurality of individual results sets includes mapping respective characteristic variables from each of the plurality of business applications to the rule variable of the rule.

12. The computer-implemented method of claim 1, wherein the combining of the plurality of individual results sets includes applying a join condition to generate the combined result set.

13. The computer-implemented method of claim 1, wherein the rule includes a plurality of rule steps, and wherein the applying of the rule includes applying at least one of the plurality of rule steps.

14. The computer-implemented method of claim 13, including associating each rule step of the plurality of rule steps with a respective physical system hosting at least one of the plurality of business applications.

15. The computer-implemented method of claim 14, including associating each rule step of the plurality of rule steps with a respective script, the respective script being executed by the respective physical system.

16. The computer-implemented method of claim 13, including associating each rule step of the plurality of rule steps with at least one rule set, and associating each rule set with at least one selection rule variable to be used in a selection of data to be included in a result set of the rule set, and at least one condition rule variable to be used in detecting a deficiency type of the rule set.

17. The computer-implemented method of claim 1, including assigning the rule to at least one control, the at least one control being associated with at least one physical location.

18. A system comprising:
   a plurality of data extractors to extract data across a plurality of business applications based in part on a plurality of statements of roles and assignments associated with the plurality of business applications, each business application of the plurality of business applications having at least a respective statement of roles and assignments, and to generate a plurality of individual results sets;
   a unification module to unite the plurality of individual results sets into a unified result set;
   a rules engine to apply a rule to the unified result set to detect a procedural deficiency across the plurality of business applications based on the respective statements of roles and assignments of the plurality of business applications; and
   a remediation module to selectively perform a remedial action responsive to the detection of the procedural deficiency across the plurality of business applications.

19. The system of claim 18, wherein the plurality of data extractors are each to interface with a respective real-time agent associated with a business application of the plurality of business applications.

20. The system of claim 18, including a case manager to selectively report detection of the procedural deficiency across the plurality of business applications.

21. The system of claim 18, wherein the remediation module is to perform at least one of a at least one of a group of actions consisting of providing notification to a designated recipient, logging occurrence of the procedural deficiency, invoking a human workflow to implement the remedial action, and invoking an automated procedure to prevent occurrence of a specified event.

22. The system of claim 18, wherein a business application of the plurality of business applications is at least one of a group consisting of enterprise resource planning software, government regulatory compliance software, and physical provisioning software.

23. The system of claim 18, wherein the procedural deficiency is at least one of a group of deficiencies consisting of a violation of at least one of a company policy, a government regulation, a law, a professional rule, an accounting rule, a statement of good business practices, a condition imposed by a contract, and a corporate article.

24. A system comprising:
- first means for extracting data across a plurality of business applications based in part on a plurality of statements of roles and assignments associated with the plurality of business applications, each business application of the plurality of business applications having at least a respective statement of roles and assignments;
- second means for uniting the plurality of individual results sets into a unified result set;
- third means for applying a rule to the unified result set to detect a procedural deficiency across the plurality of business applications based on the respective statements of roles and assignments of the plurality of business applications; and
- fourth means for selectively performing a remedial action responsive to the detection of the procedural deficiency across the plurality of business applications.

25. The system of claim 18, wherein the first means is to interface with at least one real-time agent associated with a business application of the plurality of business applications.

26. The system of claim 18, including fourth means for selectively reporting detection of the procedural deficiency across the plurality of business applications.

27. A machine-readable storage medium embodying instructions that, when executed by a machine, cause machine to perform operations comprising:
- retrieve a plurality of data extractors to extract data across a plurality of business applications based in part on a plurality of statements of roles and assignments associated with the plurality of business applications, each business application of the plurality of business applications having at least a respective statement of roles and assignments;
- execute the plurality data extractors to generate a plurality of individual results sets;
- combine the plurality of individual results sets into a combined result set;
- apply a rule to the combined result set to detect a procedural deficiency across the plurality of business applications based on the respective statements of roles and assignments of the plurality of business applications; and
- selectively perform a remedial action responsive to the detection of the procedural deficiency across the plurality of business applications.

\* \* \* \* \*